(12) United States Patent
Brooks et al.

(10) Patent No.: US 8,905,198 B2
(45) Date of Patent: Dec. 9, 2014

(54) MANUAL WHEEL CHOCKS WITH ENHANCED BRACING UPON DEPLOYMENT

(75) Inventors: Andrew Brooks, Thiensville, WI (US); Jonathan Andersen, Racine, WI (US); Kurt Lessard, South Milwaukee, WI (US); Kyle Nelson, Cedarburg, WI (US); Timothy Cotton, Milwaukee, WI (US); Ben Wieberdink, Cedar Grove, WI (US); Bradley J. Stone, Port Washington, WI (US); Donald L. Anton, Menomonee Falls, WI (US); Joseph Manone, Mequon, WI (US); Norbert Hahn, Franklin, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 1060 days.

(21) Appl. No.: 12/365,330

(22) Filed: Feb. 4, 2009

(65) Prior Publication Data

US 2009/0194376 A1    Aug. 6, 2009

Related U.S. Application Data

(63) Continuation-in-part of application No. 12/026,008, filed on Feb. 5, 2008, now Pat. No. 8,590,673.

(51) Int. Cl.
*B60B 39/00* (2006.01)
*B65G 69/00* (2006.01)
*B60T 3/00* (2006.01)
*B61H 13/00* (2006.01)

(52) U.S. Cl.
CPC ............... *B60T 3/00* (2013.01); *B65G 69/005* (2013.01)
USPC ................................. 188/4 R; 188/5; 188/32

(58) Field of Classification Search
USPC ................... 188/4 R, 5, 32, 36, 43; 414/401
See application file for complete search history.

(56) References Cited

U.S. PATENT DOCUMENTS

| 3,146,824 A | 9/1964 | Veilleux |
| 3,305,049 A | 2/1967 | Willey |

(Continued)

FOREIGN PATENT DOCUMENTS

| CN | 1735525 A | 2/2006 |
| DE | 4120035 | 12/1992 |

(Continued)

OTHER PUBLICATIONS

United States Patent and Trademark Office, "Advisory Action," issued in connection with U.S. Appl. No. 12/026,008, issued May 23, 2012, 40 pages.

(Continued)

*Primary Examiner* — Melody Burch
(74) *Attorney, Agent, or Firm* — Hanley, Flight & Zimmerman, LLC.

(57) ABSTRACT

An example wheel restraint includes a wheel chock that is manually movable between a retracted or release position clear of a wheel of a vehicle at a loading dock and an operative position to block the path of the wheel. In the release position, the chock can be manually moved freely along a track that is mounted to a driveway of the dock. When the chock is manually moved from its release position to its operative position, a locking feature automatically restricts the movement of the chock relative to the track. When the chock is manually moved back to its release position, the locking feature automatically disengages. Although the wheel chock is connected to a track, much of the force exerted by the wheel against the chock can be transmitted directly from the chock to the driveway.

7 Claims, 25 Drawing Sheets

(56) References Cited

U.S. PATENT DOCUMENTS

| | | | |
|---|---|---|---|
| 4,854,790 | A | 8/1989 | Andre |
| 5,096,021 | A | 3/1992 | Tart |
| 5,249,905 | A | 10/1993 | Warner et al. |
| 5,302,063 | A | 4/1994 | Winsor |
| 5,375,965 | A | 12/1994 | Springer et al. |
| 5,454,682 | A | 10/1995 | Alexander |
| 5,582,498 | A | 12/1996 | Springer et al. |
| 5,709,518 | A | 1/1998 | Alexander et al. |
| 5,743,697 | A | 4/1998 | Alexander |
| 5,896,957 | A | 4/1999 | Berends et al. |
| 5,927,928 | A | 7/1999 | Hageman et al. |
| 5,934,857 | A | 8/1999 | Alexander |
| 6,082,952 | A | 7/2000 | Alexander |
| 6,092,970 | A | 7/2000 | Hahn et al. |
| 6,773,221 | B2 | 8/2004 | Belongia et al. |
| 7,032,710 | B2 | 4/2006 | Anderson et al. |
| 7,032,720 | B2 | 4/2006 | Jette et al. |
| 7,152,830 | B2 | 12/2006 | Dowell et al. |
| 8,499,897 | B2 | 8/2013 | Brooks et al. |
| 8,590,673 | B2 | 11/2013 | Andersen et al. |
| 2002/0037209 | A1* | 3/2002 | Hageman et al. ............. 414/401 |
| 2002/0141852 | A1 | 10/2002 | Hahn et al. |
| 2005/0133315 | A1 | 6/2005 | Hoofard |
| 2009/0194375 | A1 | 8/2009 | Andersen et al. |
| 2009/0194376 | A1 | 8/2009 | Brooks et al. |
| 2010/0170754 | A1 | 7/2010 | Brooks et al. |
| 2011/0162916 | A1* | 7/2011 | Saliger et al. .................. 188/32 |
| 2013/0292214 | A1 | 11/2013 | Brooks et al. |

FOREIGN PATENT DOCUMENTS

| | | |
|---|---|---|
| DE | 4427406 | 10/1995 |
| EP | 0284532 | 9/1988 |
| EP | 0937669 | 8/1999 |
| EP | 1112950 | 4/2001 |
| FR | 2736336 | 1/1997 |
| WO | 9702201 | 1/1997 |

OTHER PUBLICATIONS

United States Patent and Trademark Office, "Non-Final Office Action," issued in connection with U.S. Appl. No. 12/026,008, mailed Nov. 10, 2011, 10 pages.

Australian Government IP Australia, "Examination Report," issued in connection with Australian application serial No. 2009212478, issued Apr. 3, 2012, 2 pages.

International Searching Authority, "International Search Report," issued in connection with international application serial No. PCT/US2010/021823, mailed May 11, 2010, 4 pages.

International Searching Authority, "Written Opinion of the International Searching Authority," issued in connection with international application serial No. PCT/US2010/021823, mailed May 11, 2010, 8 pages.

International Bureau, "International Preliminary Report on Patentability," issued in connection with international application serial No. PCT/US2010/021823, issued Aug. 9, 2011, mailed Aug. 18, 2011, 9 pages.

International Bureau, "International Preliminary Report on Patentability," issued in connection with international application serial No. PCT/US2009/033100, mailed Aug. 19, 2010, 10 pages.

United States Patent and Trademark Office, "Final Office Action," issued in connection with U.S. Appl. No. 12/026,008, mailed Mar. 15, 2012, 14 pages.

Australian Government IP Australia, "Examination Report," issued in connection with Australian application serial No. 2010210919, issued Feb. 27, 2012, 2 pages.

United States Patent and Trademark Office, "Election/Restrictions," issued in connection with U.S. Appl. No. 12/026,008, mailed Mar. 15, 2011, 7 pages.

International Searching Authority, "International Search Report," issued in connection with counterpart international application No. PCT/US2009/033100, mailed Apr. 4, 2009, 4 pages.

International Searching Authority, "Written Opinion of the International Searching Authority,"issued in connection with counterpart international application No. PCT/US2009/033100, mailed Apr. 4, 2009, 12 pages.

International Searching Authority, "Corrected International Search Report," issued in connection with counterpart international application No. PCT/US2009/03310, mailed Apr. 15, 2009, 6 pages.

International Searching Authority, Corrected Written Opinion of the International Searching Authority, issued in connection with counterpart international application No. PCT/US2009/033100, mailed Apr. 15, 2009, 9 pages.

United States Patent and Trademark Office, "Non-Final Office Action," issued in connection with U.S. Appl. No. 12/026,008, issued Oct. 4, 2012, 16 pages.

Canadian Intellectual Property Office, "Office Action," issued in connection with Canadian application serial No. 2,751,591, issued Jan. 17, 2013, 2 pages.

United States Patent and Trademark Office, "Non-Final Office Action," issued in connection with U.S. Appl. No. 12/690,555, issued Nov. 30, 2012, 8 pages.

United States Patent and Trademark Office, "Notice of Allowance," issued in connection with U.S. Appl. No. 12/690,555, mailed Apr. 5, 2013, 26 pages.

The United States Patent and Trademark Office, "Requirement for Restriction/Election," issued in connection with U.S. Appl. No. 12/690,555, on Sep. 25, 2012, 39 pages.

The United States Patent and Trademark Office, "Final Office Action," issued in connection with U.S. Appl. No. 12/026,008, on Mar. 7, 2013, 17 pages.

The United States Patent and Trademark Office, "Advisory Action," issued in connection with U.S. Appl. No. 12/026,008, on May 15, 2013, 4 pages.

Australian Government IP Australia, Notice of Acceptance, issued in connection with Australian Patent Application No. 2009212478, on May 22, 2013, 3 pages.

The United States Patent and Trademark Office, "Notice of Allowance and Fees Due," issued in connection with U.S. Appl. No. 12/026,008, on Jul. 17, 2013, 27 pages.

State Intellectual Property Office of the People's Republic of China, "First Office Action," issued in connection with Chinese Patent Application No. 201080015090.1, on Aug. 22, 2013, 12 pages.

Canadian Intellectual Property Office, "Notice of Allowance," issued in connection with Canadian Patent Application No. 2,751,591, on Oct. 29, 2013, 1 page.

* cited by examiner

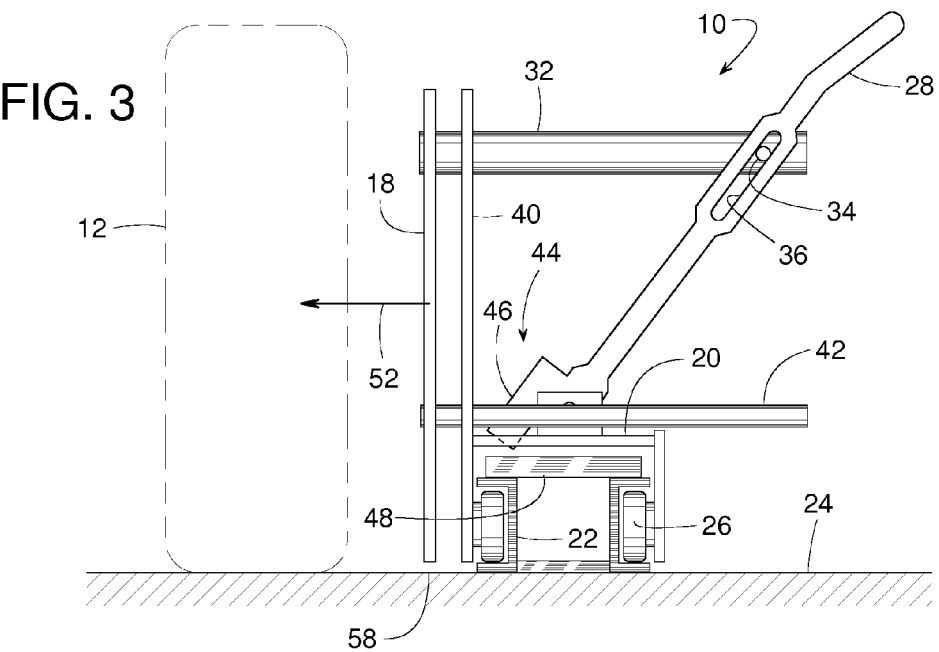
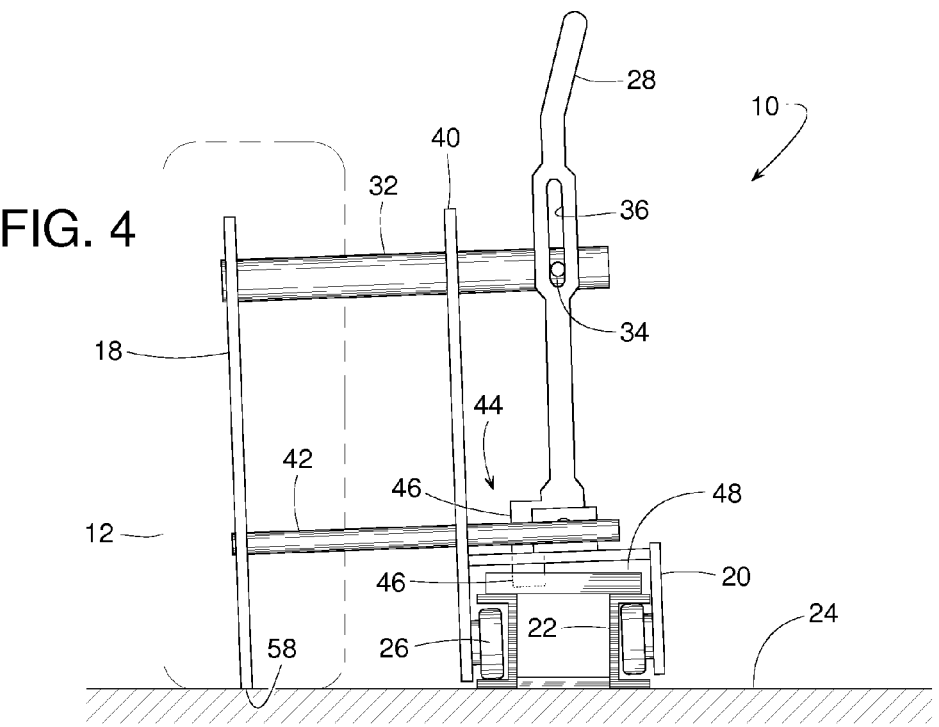

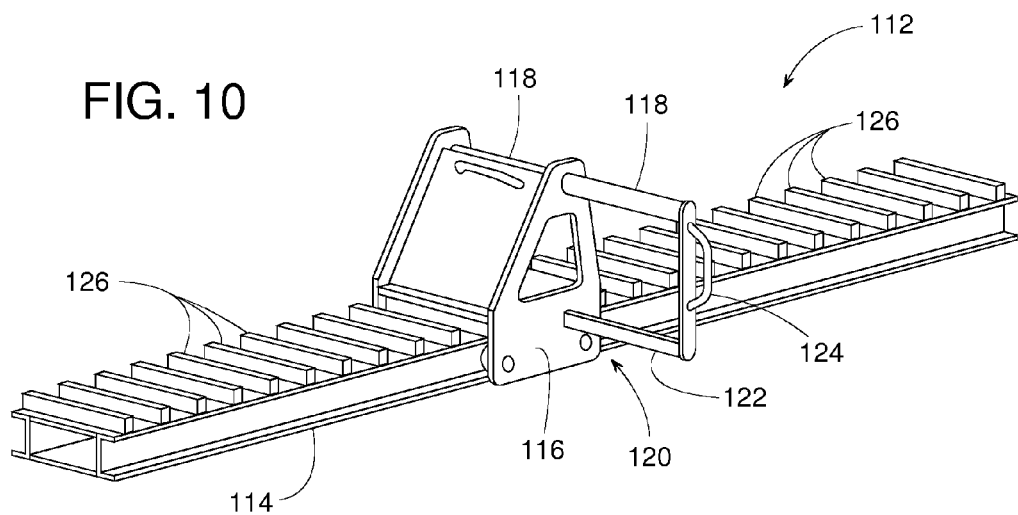
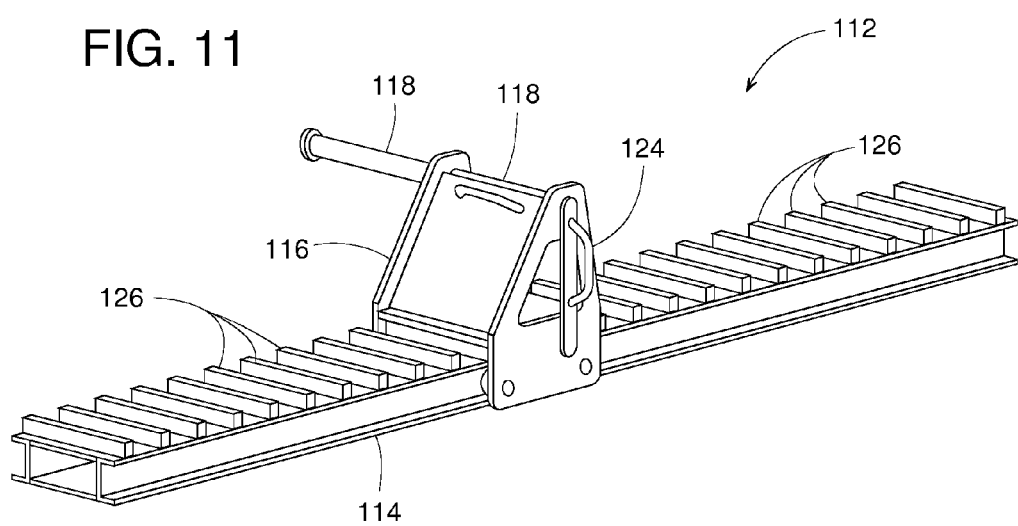

MANUAL WHEEL CHOCKS WITH ENHANCED BRACING UPON DEPLOYMENT

CROSS REFERENCE TO RELATED APPLICATIONS

This application is a continuation-in-part of U.S. patent application Ser. No. 12/026,008 entitled "Manual Wheel Chock With Automatic Positive Locking," filed Feb. 5, 2008, which is hereby incorporated herein in its entirety.

FIELD OF THE DISCLOSURE

The subject disclosure generally pertains to restraining vehicles at loading docks and more specifically to manually operated wheel chocks.

BACKGROUND

When a truck, trailer or some other vehicle is parked at a loading dock, often a vehicle restraint is used to keep the truck from inadvertently moving away from an elevated platform of the dock. Preventing the vehicle from inadvertently moving forward allows a forklift truck to safely drive between the dock platform and the truck for the purpose of loading or unloading the cargo inside the truck.

A variety of vehicle restraints are available that can be installed at a loading dock. For example, a vehicle restraint can include an ICC-style restraint that engages a truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases a wheel restraint can be used for blocking one or more of the truck's wheels

BRIEF DESCRIPTION OF THE DRAWINGS

FIG. 3 is a front view of the example manual wheel restraint shown in the position of FIG. 1.

FIG. 4 is a front view of the example manual wheel restraint shown in the position of FIG. 2.

FIG. 10 is a perspective view of yet another example manual wheel restraint shown in a retracted position.

FIG. 11 is a perspective view similar to FIG. 10 but showing the restraint in an operative position.

DETAILED DESCRIPTION

Figure 1:
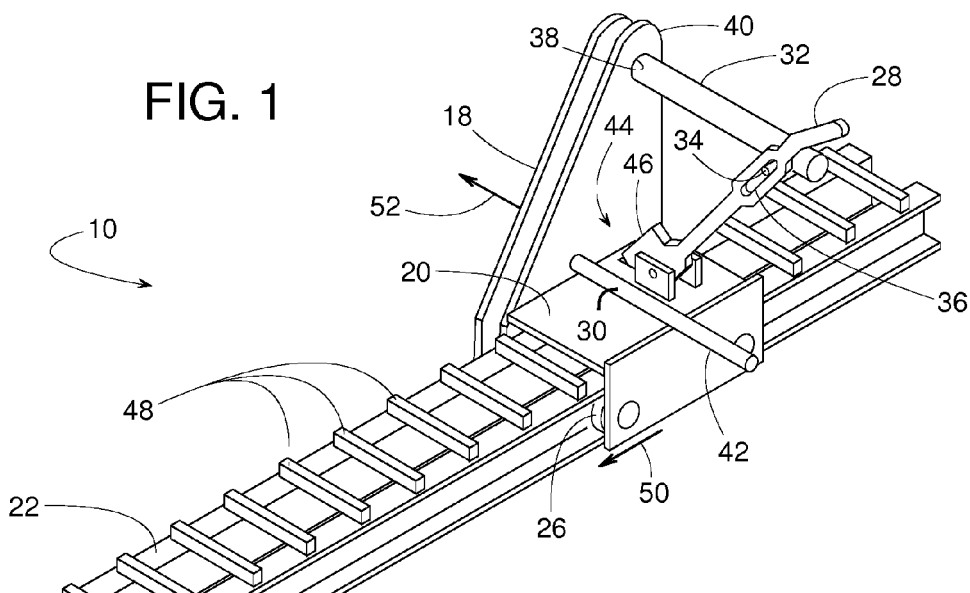
FIG. 1 is a perspective view of an example manual wheel restraint shown in a retracted position.

In general, the most common wheel restraint is simply a wheel chock that wedges between the driveway and the underside of the wheel. However, wheel chocks often slip out of position on driveways that are slippery due to oil, rain, ice, sand, gravel, or dirt. Moreover, wheel chocks usually are loose items that do not permanently attach to the loading dock area, so they often get misplaced.

Another wheel restraint system includes a wheel chock that is coupled to the loading dock by way of an articulated arm. The wheel chock of this restraint system can be placed in mating engagement with a serrated base plate that is anchored to the driveway.

However, such wheel restraint systems include a counterweight spring on the arm that tends to prevent the wheel chock from resting its full weight upon the base plate. Also, the length to which the arm must extend to reach the wheel can adversely affect the angular relationship (about a vertical axis) between the mating surfaces of the chock and base plate. An example of such wheel restraint system is described in U.S. Pat. No. 7,032,720.

Another system includes a wheel chock that is deployed in a two-step process. The chock is, first, manually positioned along a track and is, then, held in place by subsequently inserting a pin that locks the wheel chock to the track. This two-step process may be undesirable. Such an example system is described in U.S. Pat. No. 6,092,970.

Other known wheel restrain systems include automatic or powered wheel chocks. However, wheel restraint systems having automatic or powered wheel chocks often have complicated mechanisms that can be expensive to produce and maintain. One known wheel restraint system includes a powered device that during deployment drags a wheel chock across a driveway, which might abrasively wear the underside of chock and/or the top surface of the driveway. Such a chock might also catch on driveway irregularities. Known wheel restraint systems having automatic or powered wheel chocks are described in U.S. Pat. Nos. 3,305,049; 5,927,928; 5,709,518 and 5,249,905.

Additionally or alternatively, some automatic wheel chocks extend below the surface of the driveway and create cavities or pockets in which dirt, water runoff, and even ice can accumulate. Furthermore, restraints that extend below the surface of the driveway or approach may be difficult and expensive to install because modification of the driveway or approach is required.

In some cases, the restraint system includes a driveway-mounted track that needs to be sufficiently strong to support the weight of a heavy truck or trailer, which may add cost and complexity to the restraint system.

Furthermore, some facilities require an operator to be on the driveway or approach in the area of a loading dock to verify that a vehicle restraint has been placed. If an operator must be in the area, then it may be cost and time effective to have that operator position the vehicle restraint, which may make expensive, automatic restraints less desirable options.

FIGS. 1-6 show an example wheel restraint system 10 for restraining at least one wheel 12 of a vehicle 14 at a loading dock 16. Restraint 10 includes a wheel chock 18 that can be manually positioned adjacent (e.g., forward of) wheel 12 and selectively moved manually between an operative position obstructing wheel 12 and a retracted position clear of wheel 12. Chock 18 is illustrated in the retracted position in FIGS. 1, 3 and 5 and is illustrated in an operative position in FIGS. 2, 4 and 6. In the operative position, chock 18 obstructs wheel 12 to restrain vehicle 14 and help prevent it from inadvertently moving away from dock 16 so that cargo can be safely conveyed on and off of the vehicle. In the retracted position, wheel chock 18 is clear of wheel 12 to allow vehicle 14 to freely enter and leave the dock area.

So that the position of wheel chock 18 can be adjusted or aligned with respect to the location of wheel 12, chock 18 is attached to a track follower 20 that can travel along a track 22 that is mounted to a driveway 24 of dock 16. A set of rollers 26 or slide blocks can help facilitate the translation or movement of track follower 20.

To help manually move wheel chock 18 between its retracted and operative positions, a lever 28 is pivotally coupled to track follower 20 via a pin 30 and coupled to a rod 32 via a pin 34 and a slot 36. Rod 32 extends from wheel chock 18 and can slide in and out through a hole 38 defined in a guide plate 40. The guide plate 40 rigidly extends from track follower 20. Manually tilting lever 28 from its position shown in FIGS. 1 and 3 to its position shown in FIGS. 2 and 4 moves wheel chock 18 from its retracted position to its operative position. A second rod 42 rigidly extending from wheel chock 18 is slidably coupled to plate 40 helps guide and support wheel chock 18.

Wheel restraint 10 also includes a locking feature 44 so that once wheel chock 18 is properly positioned somewhat adjacent to but more forward than wheel 12, locking feature 44 automatically restrains track follower 20 to track 22 as wheel chock 18 is manually moved from its retracted to operative position. While the mechanics of the locking feature may vary, locking feature 44 basically moves between an engaged position (FIGS. 2, 4 and 6) to limit the track follower's movement and a disengaged position (FIGS. 1, 3 and 5) to permit free movement of track follower 20 along track 22.

In some examples, locking feature 44 is a tab 46 extending from the lower end of lever 28. However, in other examples, the locking feature can include features such as, but not limited to, a tooth, protrusion, pin, hole, slot, or any other member that can engage a complementary mating feature. For the example of FIGS. 1-6, manually tilting lever 28 from its position of FIGS. 1 and 3 to that of FIGS. 2 and 4 not only extends wheel chock 18 to its operative position, but lever 28 also rotates tab 46 into engagement within a series of catches 48 on track 22. In this case, catches 48 are a series of bars distributed along track 22. The bars are spaced a distance apart to create a series of openings. In the engaged position (FIGS. 2 and 4), tab 46 extends into a selected one of the series of openings between the bars. This limits the movement of tab 46 between two adjacent bars, which thus limit the movement of track follower 20 and wheel chock 18 along track 22. Although catches 48 can be in form of bars, other examples of catches include, but are not limited to, a series of teeth, protrusions, pins, holes, slots, or any series of features that can be suitably engaged by a particular locking feature.

Figure 5:
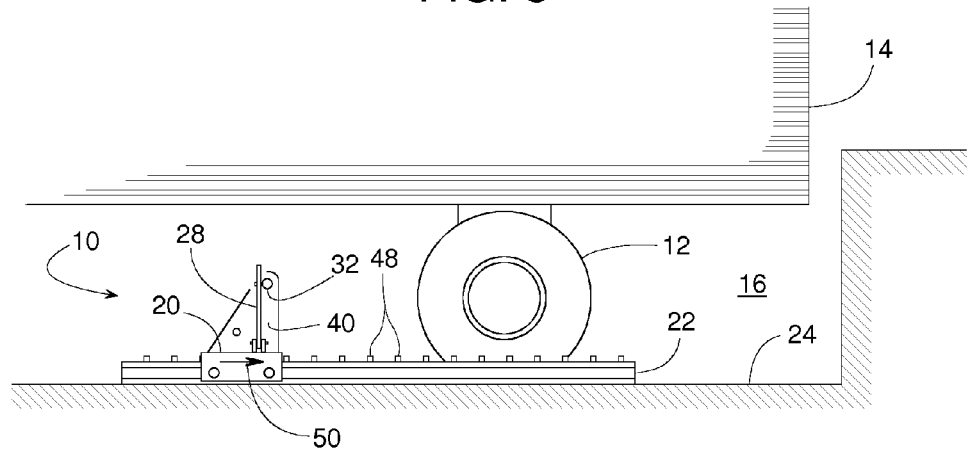
FIG. 5 is a side view of the example vehicle restraint shown in the position of FIG. 1.

A typical sequence of operation of system 10 could be as follows: 1) wheel chock 18 is retracted and positioned at some arbitrary or stored location along track 22 (e.g., FIGS. 1 and 5); 2) vehicle 14 backs into dock 16 to the position of FIG. 5; 3) with chock 18 retracted and locking feature 44 disengaged; 4) track follower 20 is manually moved along track 22 to properly position chock 18 (e.g., slightly ahead of wheel 12); 5) lever 28 is manually actuated to move chock 18 to its operative position as well as simultaneously and automatically move locking feature 44 to its engaged position, thereby obstructing wheel 12 and thus restraining vehicle 14 at dock 16. Arrow 50 represents the step of manually moving chock 18 along track 20, and arrow 52 represents manually moving chock 18 from its retracted to operative position.

Figure 2:
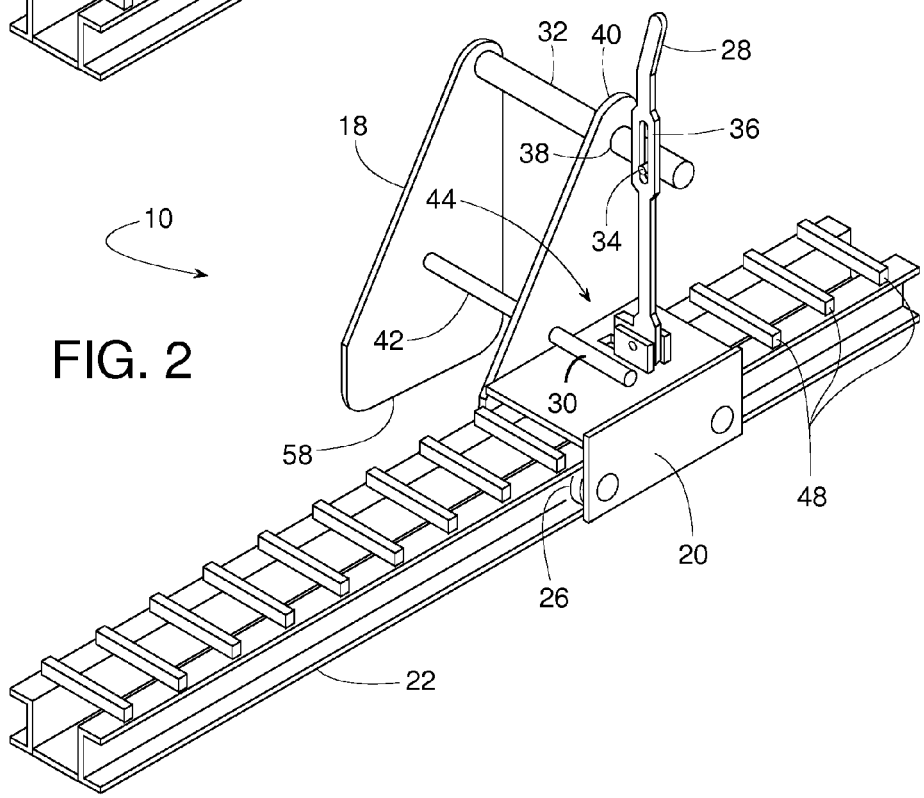
FIG. 2 is a perspective view similar to FIG. 1 but with the restraint in an operative position.

To later release vehicle 14 from the vehicle restraint 10, lever 28 is manually moved from its position of FIGS. 2 and 4 to its position as shown in FIGS. 1 and 3. Moving the lever 28 to cause the wheel chock 18 to move from its operative position to its retracted position automatically disengages locking feature 44 to release track follower 20 from the track 22 so that track follower 20 can then be moved to some designated stored position on track 22.

Figure 6:
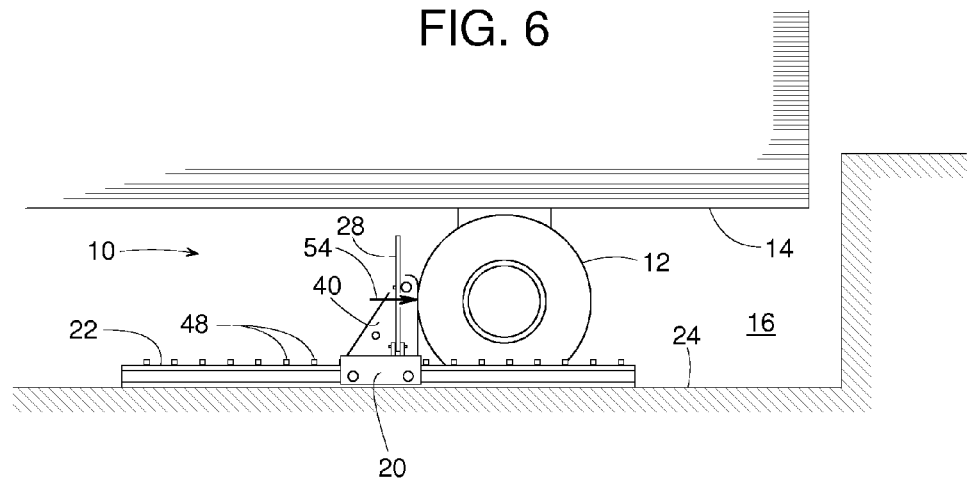
FIG. 6 is a side view of the example vehicle restraint shown in the position of FIG. 2.

When wheel chock 18 is in the operative position, chock 18 exerts a force 54 against wheel 12, as shown in FIG. 6. To prevent force 54 from causing deformation (i.e., strain) and/or stress fracture (i.e., exerting a force that exceeds the yield strength) to the rods 32 and 42, guide plate 40, track follower 20, track 22, and/or other parts of system 10, at least some of force 54 preferably is at least partially distributed or transmitted directly from wheel chock 18 to driveway 24. This can be achieved by the tire of wheel 12 forcing chock 18 downward until a lower surface 58 of chock 18 engages and thus frictionally grips driveway 24 directly. It is preferable, however, that lower surface 58 does not drag on driveway 24 when chock 18 is retracted; otherwise, such frictional drag could make it difficult to move and/or adjust the position of track follower 20 along track 22.

Protecting system 10 from excess forces while avoiding frictional drag can be accomplished by various ways. The outer diameter of rollers 26, for example, could be undersized relative to the vertical clearance provided within track 22, as shown in FIGS. 3 and 4. In this manner, when wheel chock 18 is retracted, as shown in FIG. 3, the center of gravity of track follower 20 (plus the parts thereon) is positioned to cause the track follower 20 to lay level with rollers 26 riding solidly down against track 22. When chock 18, however, extends to the operative position of FIG. 4, the center of gravity shifts sideways. This shift of the center of gravity of wheel chock 18 along with sufficient vertical clearance between rollers 26 and track 22 could possibly cause track follower 20 to tip until lower surface 58 rests upon driveway 24, as seen in FIG. 4. Regardless of whether lower surface 58 of chock 18 engages driveway 24 due to the shift of the track follower's a center of gravity causing track follower 20 to tip and/or wheel 12 simply forcing chock 18 downward, the end result is a frictional force between lower surface 58 and driveway 24 that helps counteract force 54.

In yet other examples, transmitting at least a portion force 54 directly to driveway 24 when chock 18 is in its operative position, while avoiding frictional drag when chock 18 is retracted, can be accomplished by countless other ways involving part clearances, component flexibility, spring actuated rollers, spring actuated chock, etc.

Figure 7:
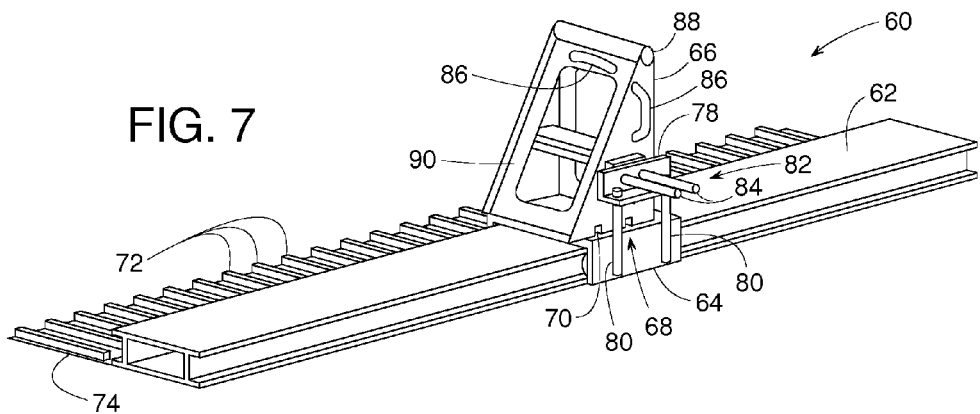
FIG. 7 is a perspective view of an alternative example manual wheel restraint illustrated in a retracted position.
Figure 8:
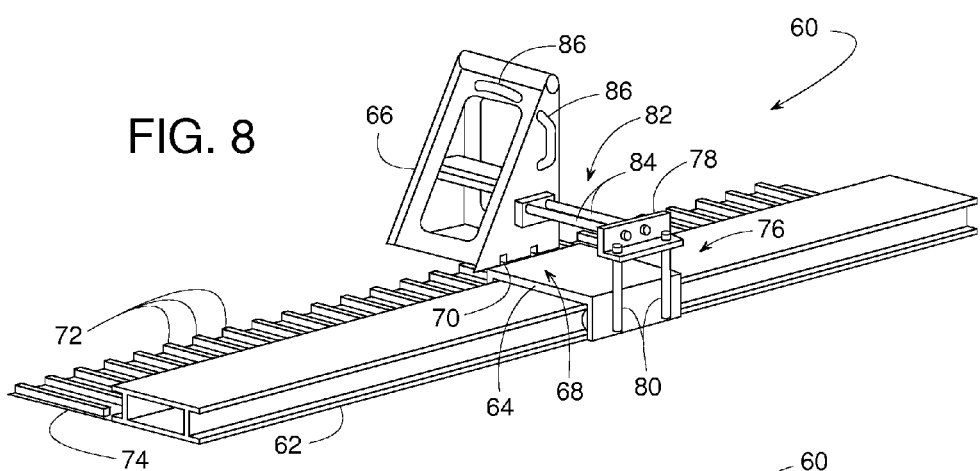
FIG. 8 is a perspective view similar to FIG. 7 but showing the restraint at an intermediate position.
Figure 9:
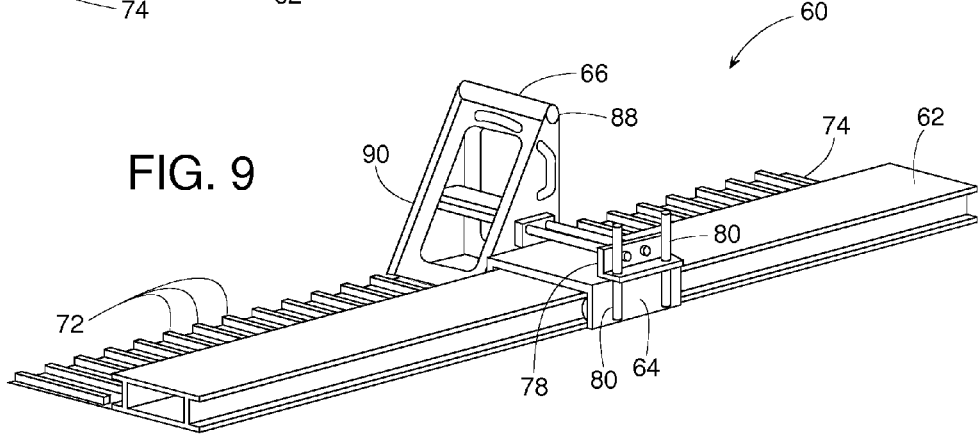
FIG. 9 is a perspective view similar to FIG. 7 but showing the restraint in an operative position.

Another example wheel restraint system 60, shown in FIGS. 7, 8 and 9, comprises a track 62 mounted to the driveway, a track follower 64, and a wheel chock 66 coupled to track follower 64. In this case, a locking feature 68 is in the form of one or more grooves 70 on the underside of chock 66. Grooves 70 are suitable for engagement with a series of catches 72 that are in the form of rectangular bars mounted to a base plate 74. Base plate 74 can be attached to track 62 and/or driveway 24. Chock 66 is shown in a retracted position in FIG. 7, an intermediate position in FIG. 8, and an operative position in FIG. 9.

In the operative position of FIG. 9, movement of chock 66 is limited by the engagement between the bars of catches 72 and grooves 70 of locking feature 68. In the retracted position of FIG. 7, chock 66 rests atop track follower 64, and locking feature 68 disengages catches 72. The disengagement of locking feature 68 allows chock 66 and track follower 64 to be readily moved along track 62 manually.

A vertical slide mechanism 76 (FIG. 8) enables chock 66 to be manually positioned between its intermediate position of FIG. 8 and its operative position of FIG. 9. Vertical slide mechanism 76 can be comprised of a block 78 slidingly coupled or attached to a pair of vertical rods 80 that are rigidly attached to track follower 64. A horizontal slide mechanism 82 enables chock 66 to be manually moved between its intermediate position of FIG. 8 and its retracted position of FIG. 7. Horizontal slide mechanism 82 can be comprised of block 78 being slidingly attached to a pair of horizontal rods 84 that rigidly extend from the side of wheel chock 66. Together, slide mechanisms 76 and 82 enable wheel chock 66 to translate both vertically and horizontally between the chock's retracted and operative positions. Handles 86 can help manually maneuver wheel chock 66.

Additionally, locking feature 68 automatically engages catches 72 as wheel chock 66 is manually moved from its retracted position of FIG. 7 to its operative position of FIG. 9.

In the illustrated example, an upper edge 88 of chock 66 engages a front surface of wheel 12, it is also possible to have a reversed arrangement where instead the front surface of wheel 12 engages an inclined surface 90 of chock 66.

In another example, shown in FIGS. 10 and 11, a wheel restraint 112 comprises a track 114 to be mounted to a driveway, a track follower 116, and a wheel chock 118 coupled to track follower 116. In this case, chock 118 is in the form of a rod, and a locking feature 120 is in the form of a bar 122. A handle 124 connected to chock 118 and bar 122 enables a user to manually slide chock 118 and bar 122 between their positions of FIGS. 10 and 11. When handle 124 is pulled out to the position of FIG. 10, chock 118 is in the retracted position and locking feature 120 is in the disengaged position. When handle 124 is pushed in to the position of FIG. 11, chock 118 is in the operative position to block a wheel of a vehicle, and locking feature 120 is in the engaged position. In the engaged position, bar 122 extends across track follower 116 and is situated between two catches 126 to restrict the movement of track follower 116 along track 114. When bar 122 is retracted, as shown in FIG. 10, bar 122 disengages catches 126, thereby allowing track follower 116 to be manually moved along the length of track 114.

Figure 12:
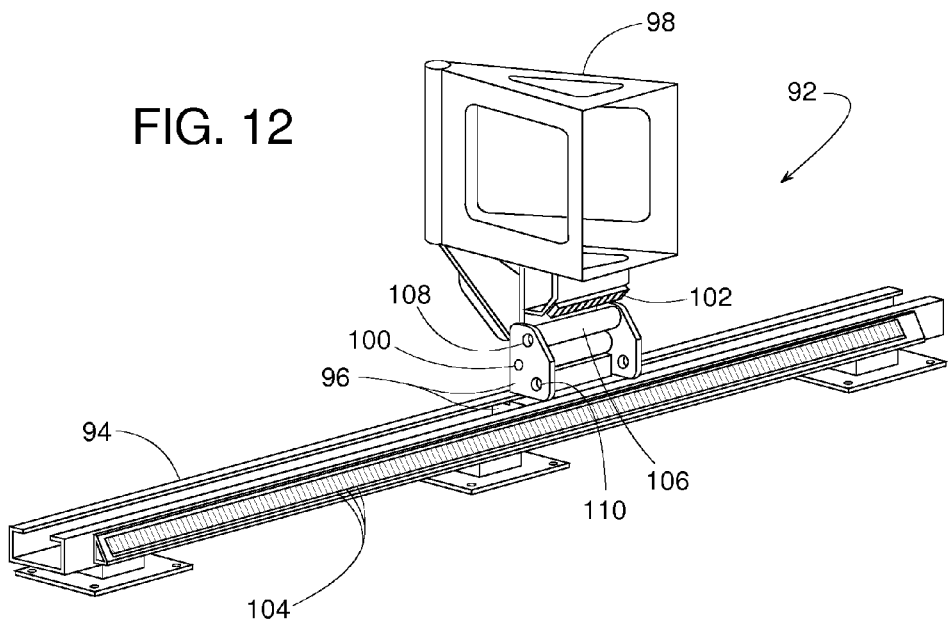
FIG. 12 is a perspective view of yet another example manual wheel restraint shown in a retracted position.
Figure 13:
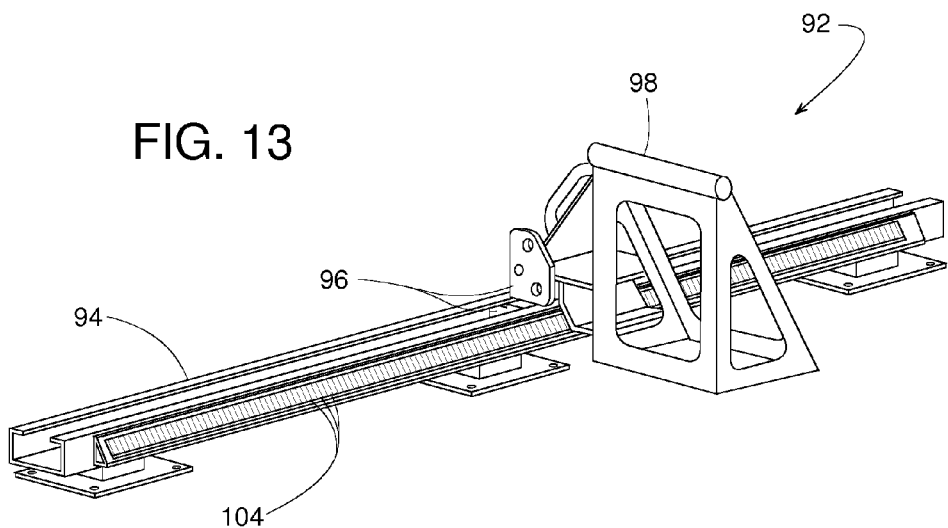
FIG. 13 is a perspective view similar to FIG. 12 but showing the example wheel restraint of FIG. 12 in an operative position.

Another wheel restraint system 92, shown in FIGS. 12 and 13, comprises a track 94, a track follower 96, and a wheel chock 98 pivotally coupled to track follower 96 via a pin 100. In this example, wheel chock 98 rotates about pin 100 between a retracted position (FIG. 12) and an operative position (FIG. 13). In the retracted position, track follower 96 and chock 98 can be manually moved along track 94. When chock 98 is rotated downward to the operative position of FIG. 13, a locking feature 102 extending from chock 98 rotates into engagement with a series of catches 104 on track 94. In this case, catches 104 include a gear rack, and locking feature 102 that matably engage to prevent the chock 98 and track follower 96 from translating or moving along track 94. Locking feature 102 is substantially similar to the gear rack, but shorter in length than the gear rack gear rack. When engaged, the two mating gear racks prevent chock 98 and track follower 96 from translating along track 94.

To restrain wheel chock 98 at its retracted or operative positions, a tube 106 can be attached to chock 98, and associated alignment holes 108 and 110 can be added to track follower 96. A removable pin (not shown) can be selectively inserted into hole 108 or 110 such that the pin extends into tube 106 to hold chock 98 at its retracted or operative positions. Additionally or alternatively, spring loaded ball plungers could be installed at holes 108 and 110, and tube 106 could provide a detent into which the plungers could extend. Conversely, a spring loaded ball plunger could be installed within tube 106, and holes 108 and 110 could then serve as detents for the plunger.

While the examples described above and in the following sections are each unique, they also have certain structural similarities. The example wheel restraints include a track structure that is affixed to the driveway (or approach) and/or the loading dock face. The track structure is generally associated with a latching, or locking, device, a portion of which is typically affixed directly to the track structure. Finally, the examples illustrated herein include a chock, or an arm, (the structural member that actually engages the vehicle) that is coupled to the track (often via a track follower) such that the chock, or arm, can translate along the track until it is desired to have the latching device "lock" or engage the chock, or arm, in place relative to the track. In many instances, the act of moving the chock, or arm, from a release position to a blocking position includes translating the chock, or arm, along the track and rotating the chock, or arm, about the track.

FIGS. 14-23 show an example wheel restraint 210 with a location-adjustable arm 212 for restraining at least one wheel 214 of a vehicle 216 at a loading dock 218. To align arm 212 to wheels at various distances from a dock face 220, arm 212 is attached to a track follower 222 and can translate or slide along a longitudinal centerline 224 of a track 226 for positioning arm 212 adjacent (e.g., just in front of) the wheel 214. Arm 212 can also rotate about track 226 between a blocking position to restrain wheel 214 and a release position to release wheel 214. Restraint 210 is shown in a blocking position in FIGS. 16, 17, 20, and 23; an intermediate position in FIGS. 19 and 22; and a release position in FIGS. 14, 15, 18, and 22. In the release position, arm 212 is clear of (e.g., does not obstruct) the wheel's path, so vehicle 216 can enter or leave the dock area. In the blocking position, restraint 210 extends into the wheel's path to inhibit vehicle 216 from inadvertently leaving dock 218 so that cargo can be safely conveyed on and off of vehicle 216.

Figure 14:
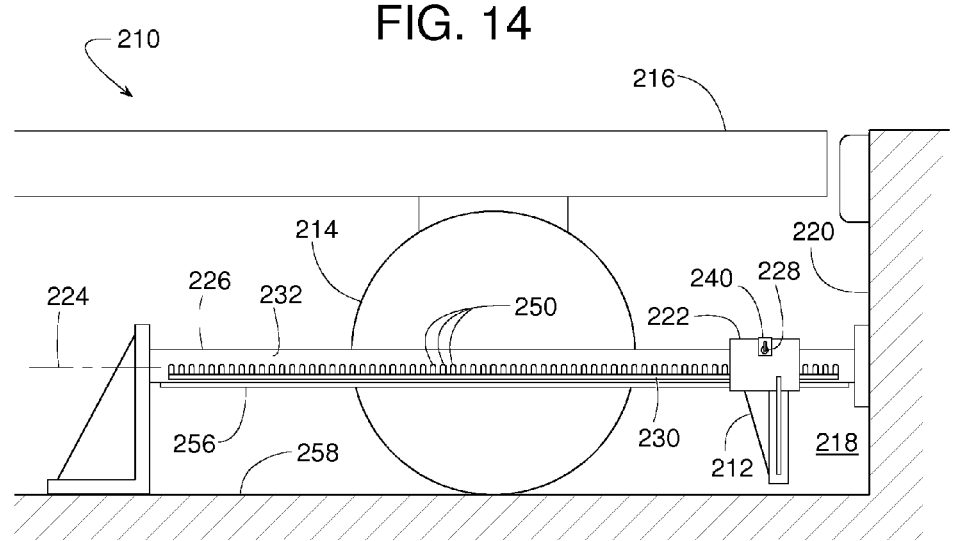
FIG. 14 is a side view of another example wheel restraint described herein and shown in a release position.
Figure 15:
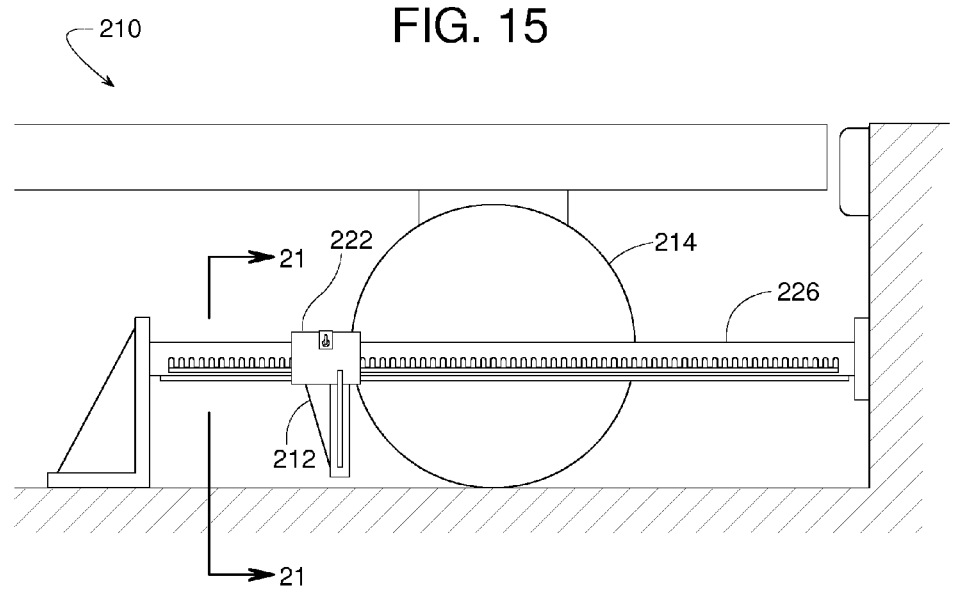
FIG. 15 is a side view showing the example wheel restraint of FIG. 14 shown in another release position.
Figure 16:
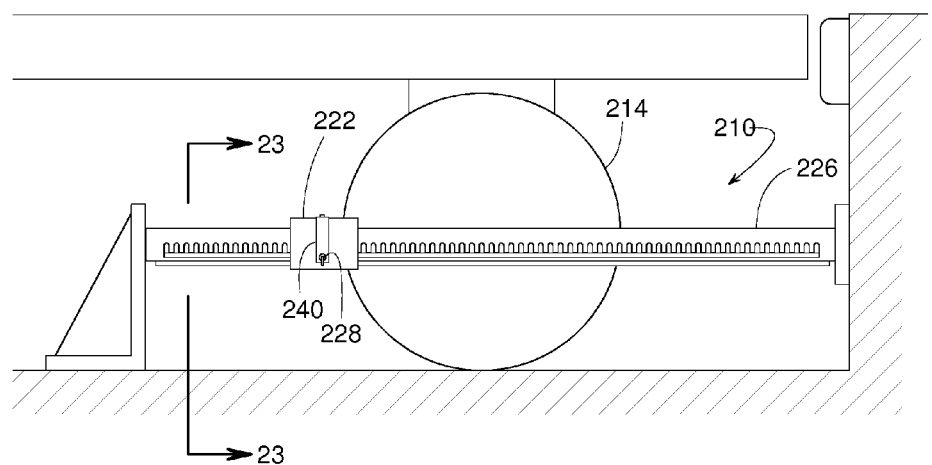
FIG. 16 is a side view of the example wheel restraint of FIG. 14 but showing the wheel restraint in a blocking position.
Figure 17:
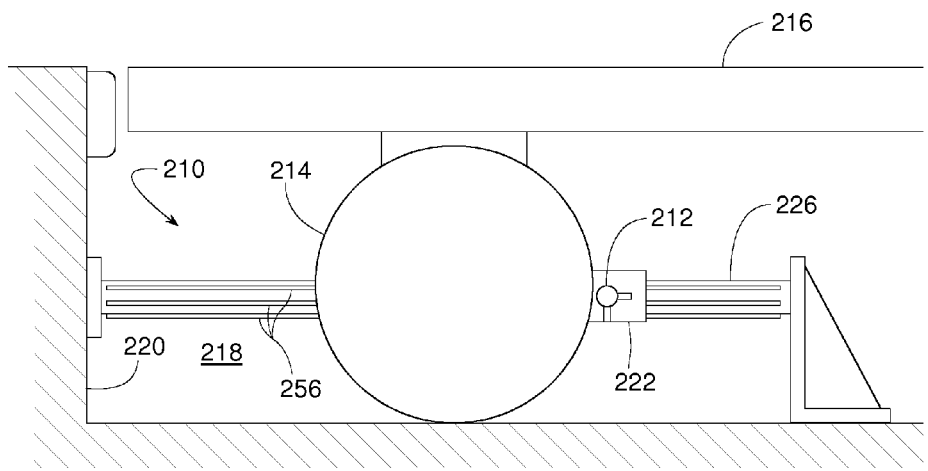
FIG. 17 is an opposite side view of the example wheel restraint shown in FIG. 16.
Figure 18:
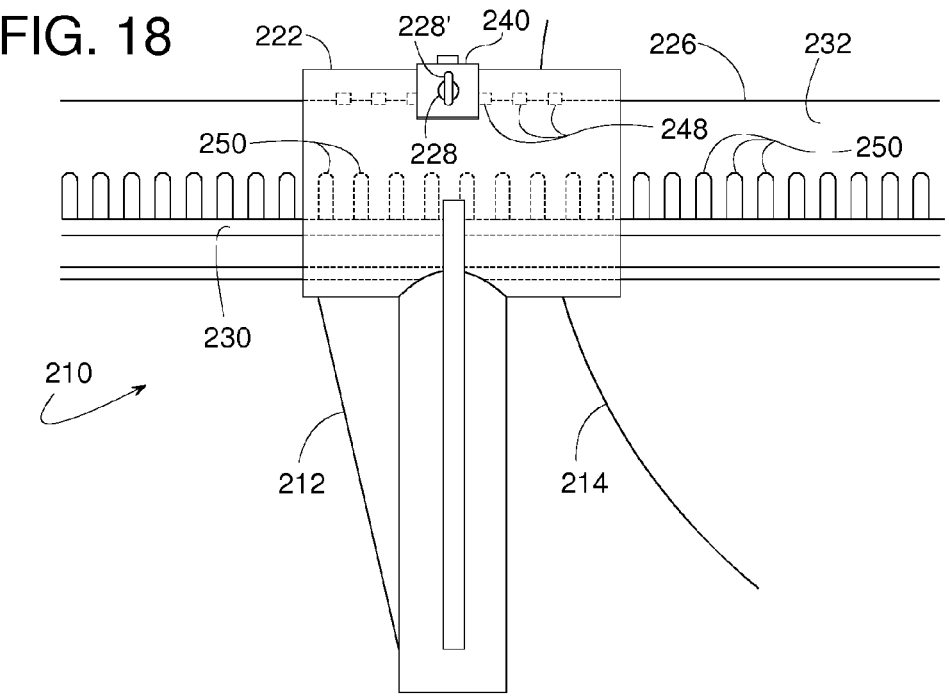
FIG. 18 illustrates an enlarged portion of the example vehicle restraint as shown in FIG. 15.

When vehicle 216 has backed into dock 218, operation of restraint 210 might begin with arm 212 hanging pendant in a stored position, as shown in FIG. 14. From this position, for example, a dockworker manually slides track follower 222 along track 226 to position arm 212 adjacent (e.g., just ahead of) wheel 214, as shown in FIG. 15. At this position, the dockworker manually rotates arm 212 upward to the blocking position directly in front of wheel 214, as shown in FIGS. 16, 17, 20 and 23. To reduce the effort required to manually rotate arm 212, a spring (e.g., mechanical or gas spring) or a counterweight can be added in a manner similar to that of wheel restraint 260 of FIGS. 24-28.

Figure 21:
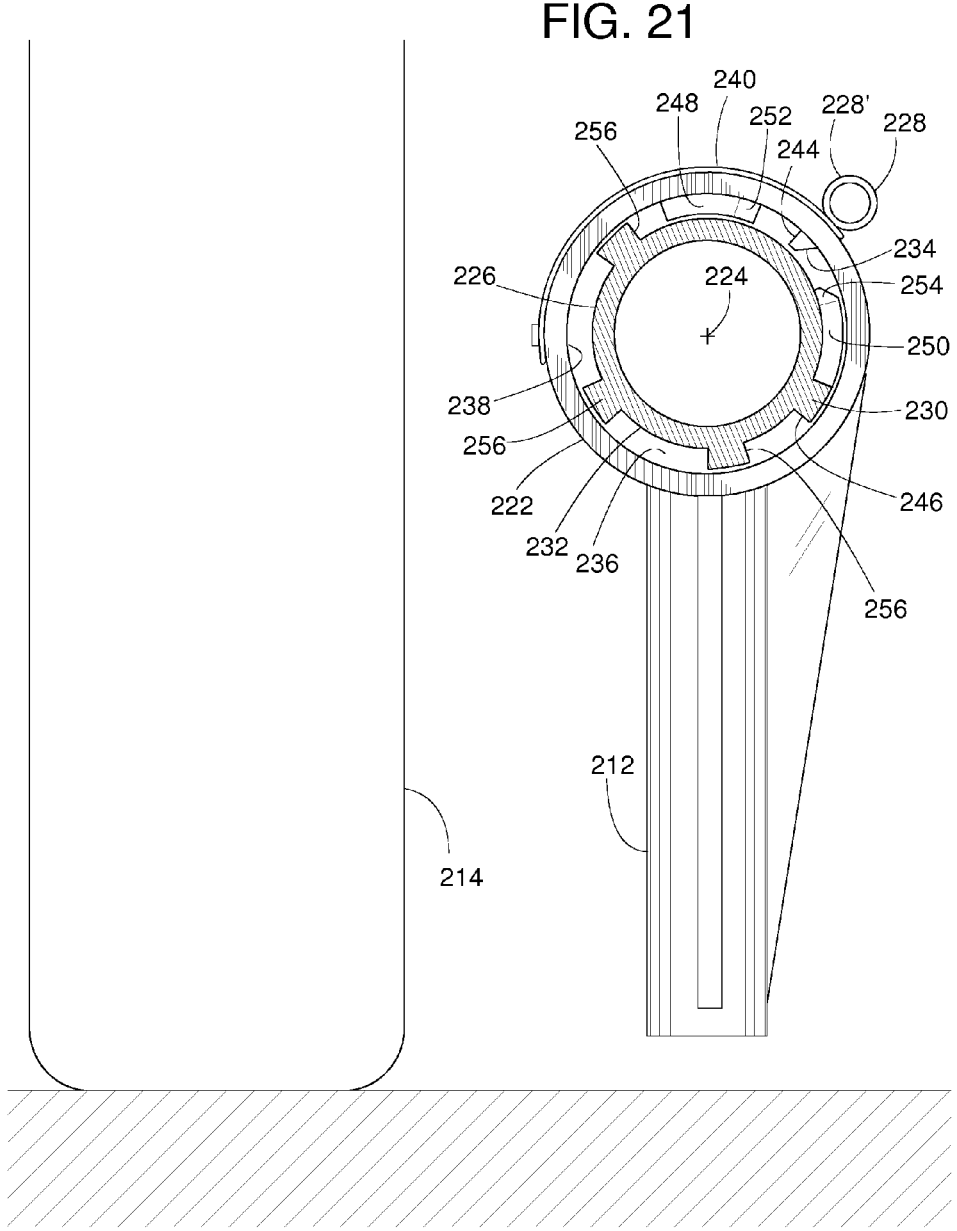
FIG. 21 is a cross-sectional view taken along line 21-21 of FIG. 15.
Figure 22:
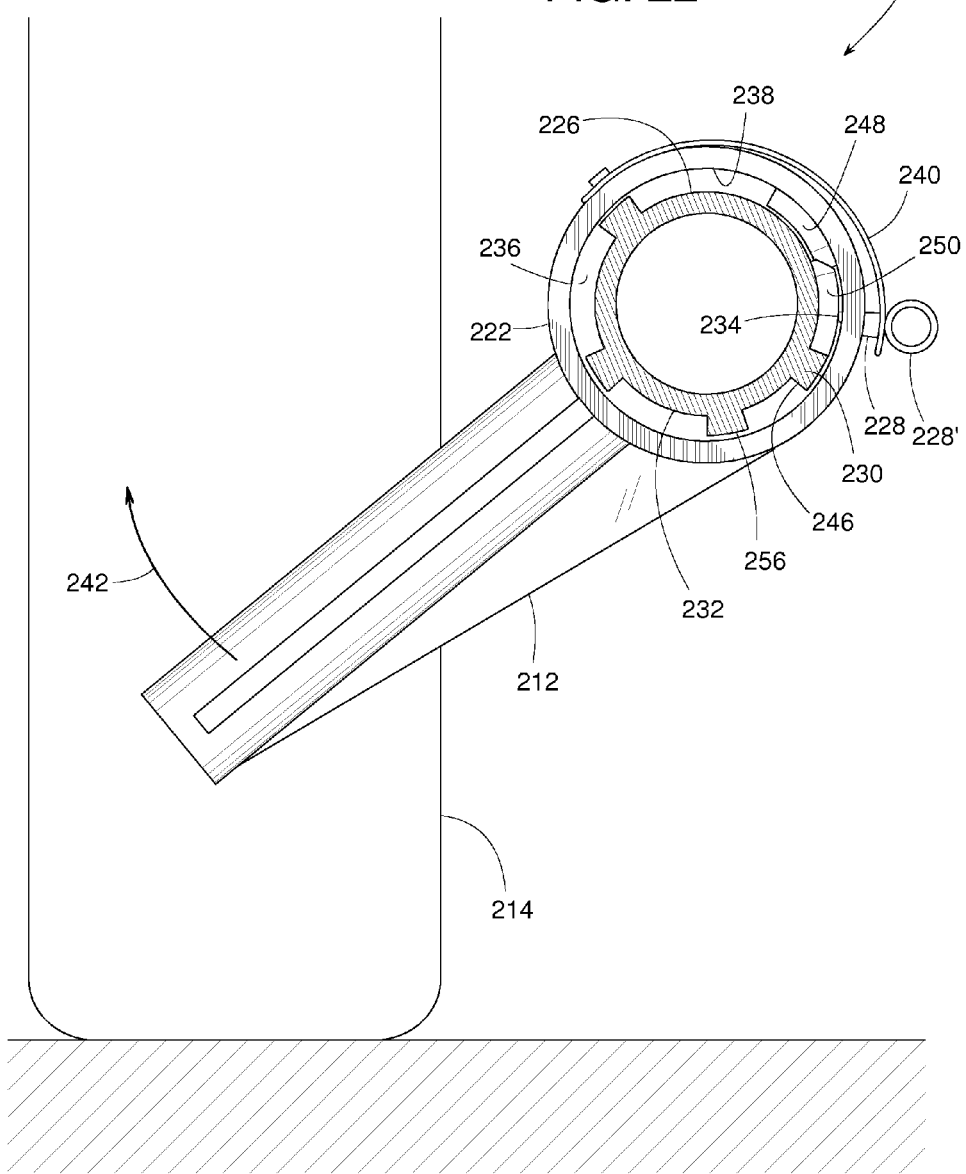
FIG. 22 is a cross-sectional view similar to FIG. 21 but showing the arm at the intermediate position of FIG. 19.
Figure 23:
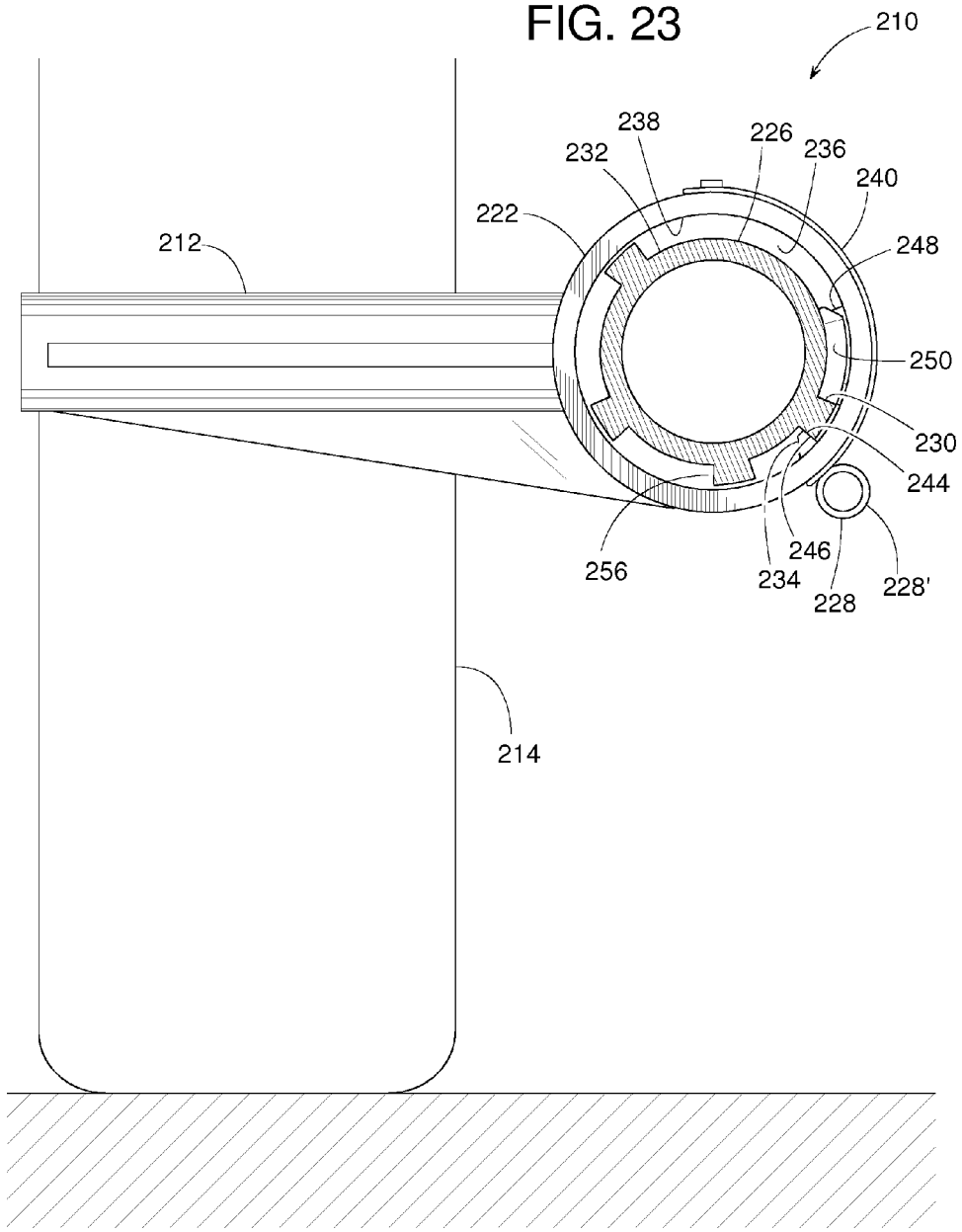
FIG. 23 is a cross-sectional view taken along line 23-23 of FIG. 16.

To maintain arm 212 (e.g., raised) in the blocking position, track follower 222 includes a retractable locking pin 228 that can engage a locking strip 230 on an outer periphery 232 of track 226. Referring to FIGS. 21, 22 and 23, pin 228 has a beveled end 234 that protrudes into an annular space 236 between an inner periphery 238 of track follower 222 and outer periphery 232 of track 226. Although a spring 240 urges pin 228 into annular space 236, as arm 212 rotates clockwise 242 (FIG. 22) from the position of FIG. 21 to that of FIG. 23, beveled end 234 of pin 228 causes pin 228 to retract outward upon encountering or engaging locking strip 230 or other parts protruding radially outward from the track's outer periphery 232. Once beveled end 234 of pin 228 rides up and over locking strip 230, as shown in FIG. 23, spring 240 forces pin 228 back down into annular space 236 where a non-beveled portion 244 of pin 228 engages a backside 246 of locking strip 230. It is this engagement that holds arm 212 in the raised blocked position.

Figure 19:
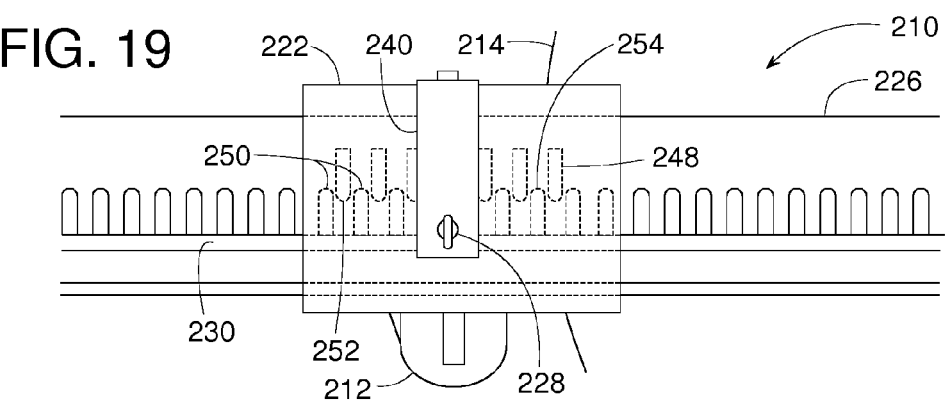
FIG. 19 is a side view similar to FIG. 18 but showing an arm of the wheel restraint at an intermediate position.
Figure 20:
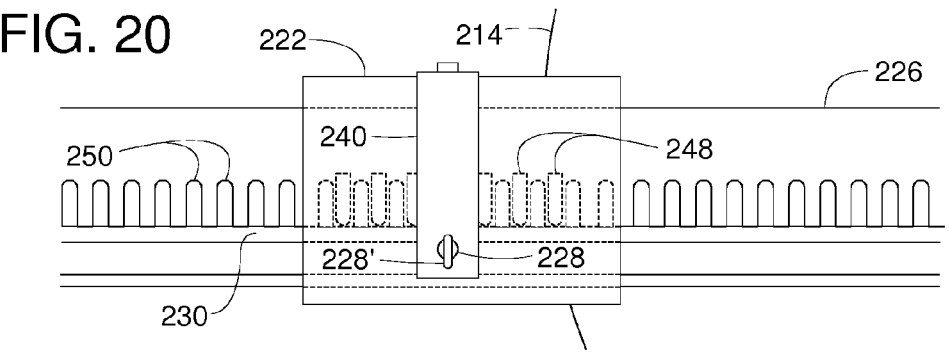
FIG. 20 illustrates an enlarged portion of the example vehicle restraint as shown in FIG. 16.

Wheel restraint 210 includes a latching device to prevent wheel 214 from simply pushing extended arm 212 along track 226, wherein the latching device includes a series of protrusions or keys 248 (or at least one protrusion or key 248) disposed on the inner periphery 238 of track follower 222 and a plurality of detents or teeth 250 on outer periphery 232 of track 226. When arm 212 is extended in the blocking position (FIGS. 20 and 23), keys 248 mesh or engage with teeth 250 to prevent track follower 222 from translating along track 226. To help align keys 248 and teeth 250 of the latching device, the keys 248 and teeth 250 have tapered or curved leading edges 252 and 254 respectively (FIGS. 19 and 21). When arm 212 is rotated to the pendant release position (FIGS. 18 and 21), keys 248 and teeth 250, are circumferentially separated, which allows track follower 222 and arm 212 to translate along track 226.

To return arm 212 from its blocking position of FIG. 23 to its release position of FIG. 21, a dockworker can manually pull a ring 228' to retract pin 228 out from engagement with locking strip 230. Once pin 228 disengages locking strip 230, arm 212 is free to rotate counterclockwise to its release position of FIG. 21.

To facilitate smooth rotation and/or translation of track follower 222 relative to track 226, a series of guide strips 256 can be installed on outer periphery 232 of track 226.

Track 226 can be firmly anchored to a driveway 258 and/or dock face 220 of dock 218 to resist forces exerted by wheel 214 against arm 212 when arm 212 is in the blocking position. Wheel restraint 210 must be strong enough to withstand forces exerted by wheel 214, and transmit those forces through arm 212, track follower 222, and track 226 to driveway 258 and/or dock face 220, without causing damage to or permanent deformation to any of the components. In this example, track 226 has a generally cylindrical cross-section. However, in other examples, track 226 may include other suitable cross-sectional shapes.

In this example, track follower 222 completely encircles track 226 such that track follower 222 (and by extension, arm 212) cannot be removed from track 226 without causing permanent damage to track 226 or track follower 222. This relationship helps prevent theft of the chocking mechanism (e.g., track follower 222 and arm 212) and also helps ensure that operators can quickly and easily find the chocking mechanism (i.e., track follower 222 and arm 212 will also be on track 226, which is affixed to driveway 258 and/or dock face 220).

Figure 25:
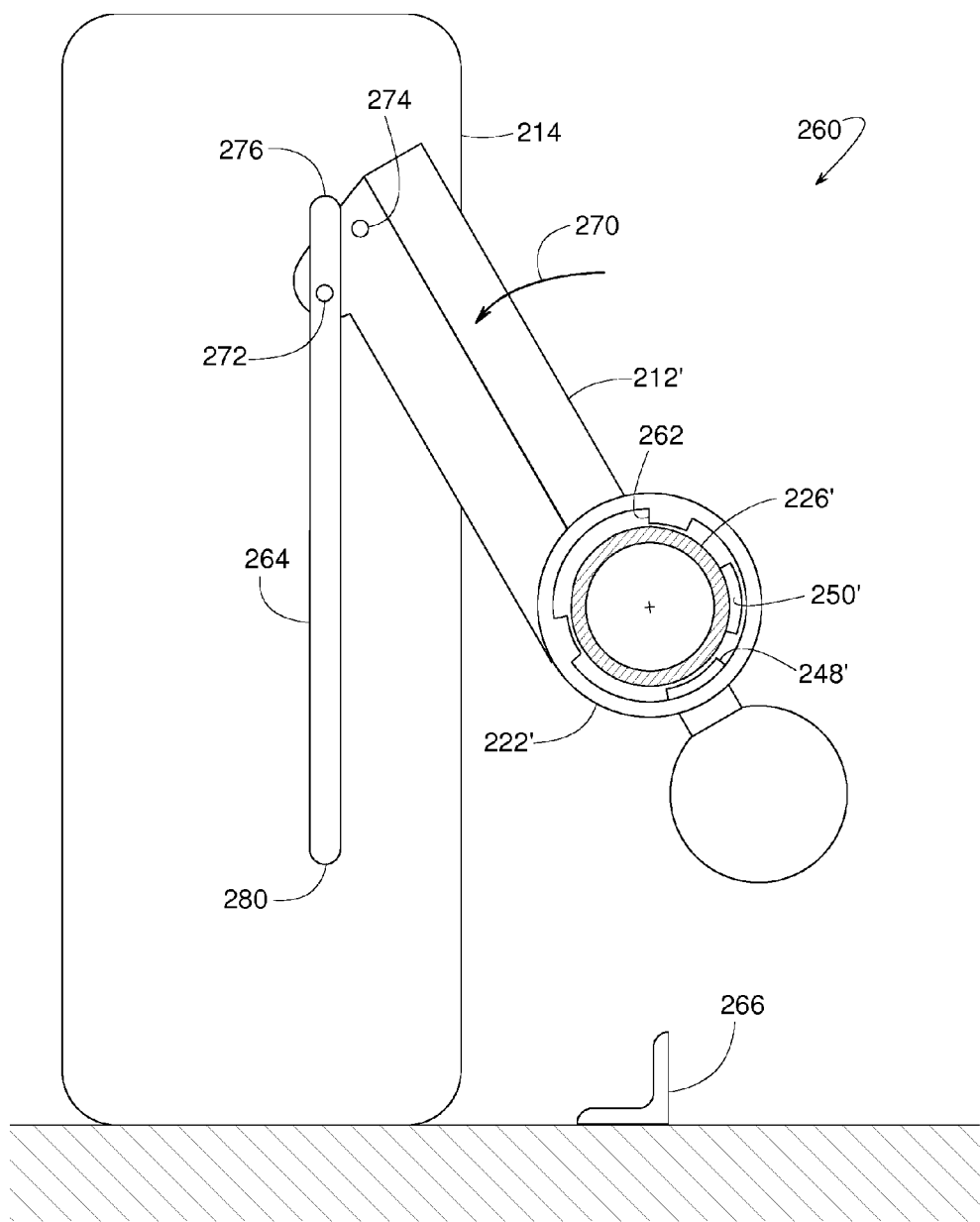
FIG. 25 is a cross-sectional view similar to FIG. 22 but showing the example wheel restraint of FIG. 24 at an intermediate position.
Figure 26:
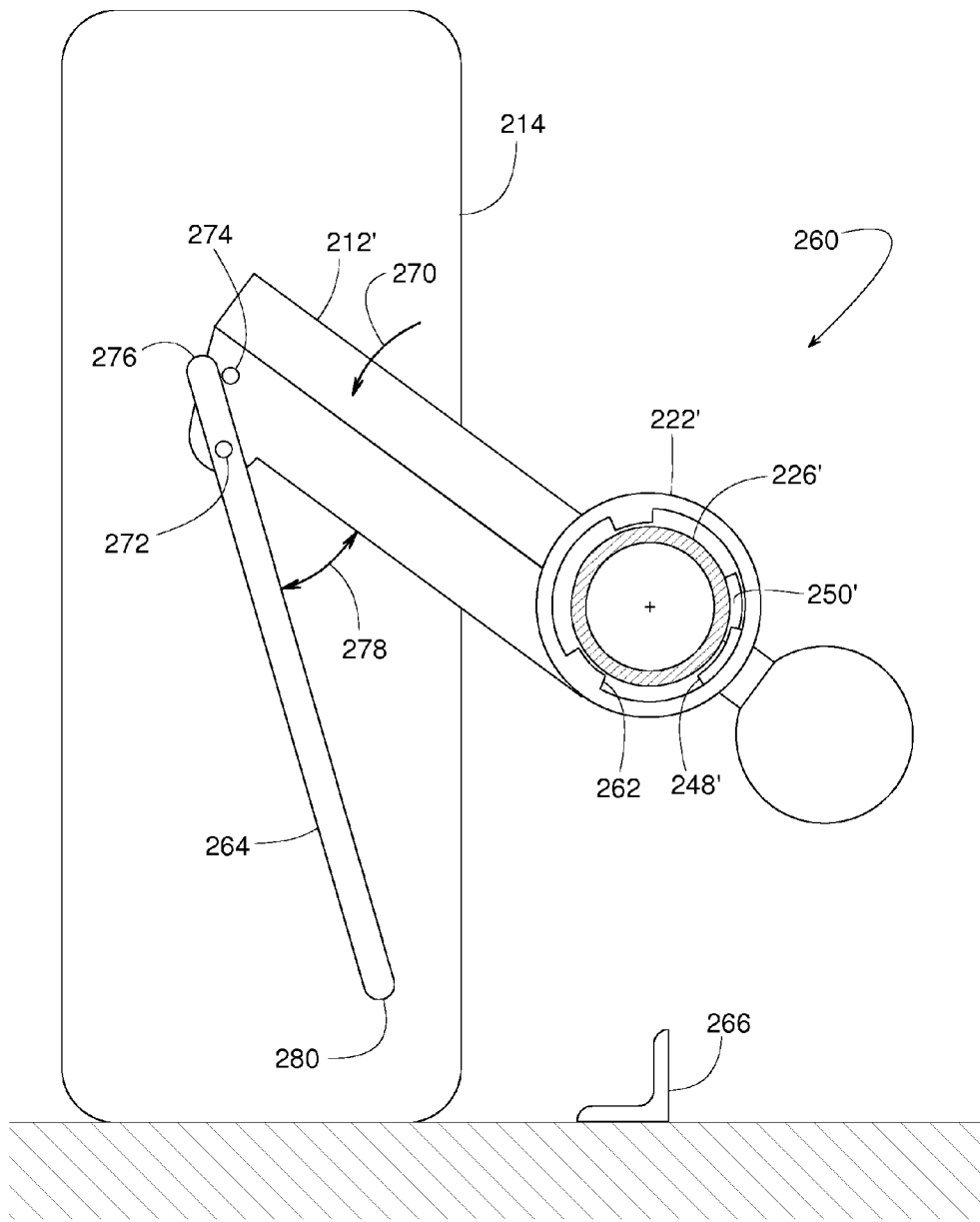
FIG. 26 is a cross-sectional view similar to FIG. 25 but showing the example wheel restraint of FIG. 24 at another intermediate position.
Figure 27:
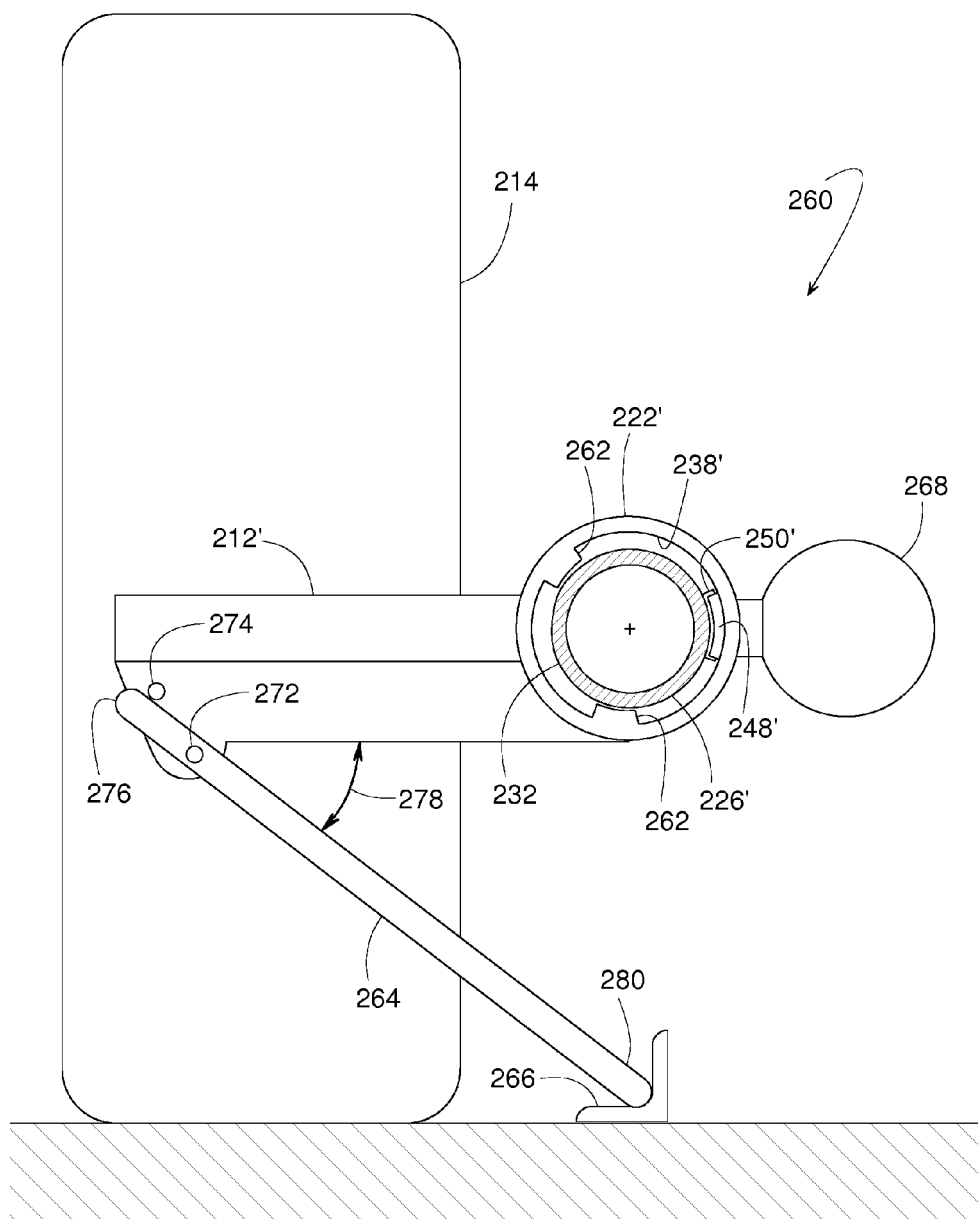
FIG. 27 is a cross-sectional view similar to FIG. 23 but showing the example wheel restraint of FIG. 24 in a blocking position.
Figure 28:
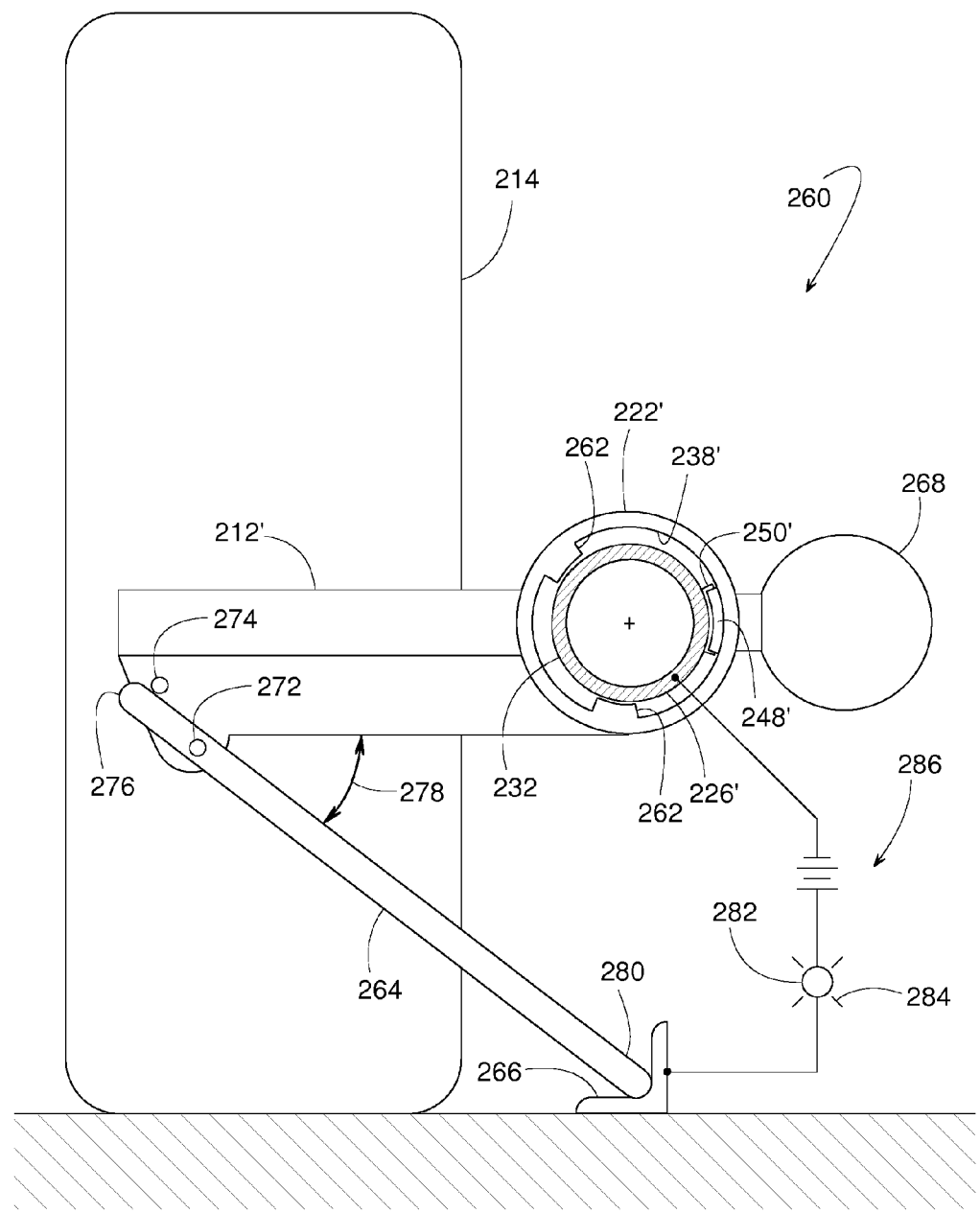
FIG. 28 is a cross-sectional view similar to FIG. 27 but schematically showing an example signal circuit to implement the example wheel restraint of FIG. 24.

FIGS. 24-28 show another example wheel restraint 260. In this example, FIG. 24 corresponds to FIG. 21, FIGS. 25 and 26 correspond to FIG. 22, and FIG. 23 corresponds to FIGS. 27 and 28. Restraint 260 includes a track 226', a track follower 222' and an arm 212' that are similar to track 226, track follower 222 and arm 212, respectively. However, guide strips 262 are disposed on track follower 222' rather than on track 226 and arm 212' has a generally upright release position rather than a pendant release position. Additionally, restraint 260 does not include a retractable locking pin (e.g., the locking pin 228). Furthermore, the example wheel restraint 260 includes an automatically retractable brace 264 to engage a lower rail 266 that helps prop arm 212' in the blocking position (FIGS. 27 and 28). Rail 266 also effectively serves as a protective surface of, for example, a driveway.

Figure 24:
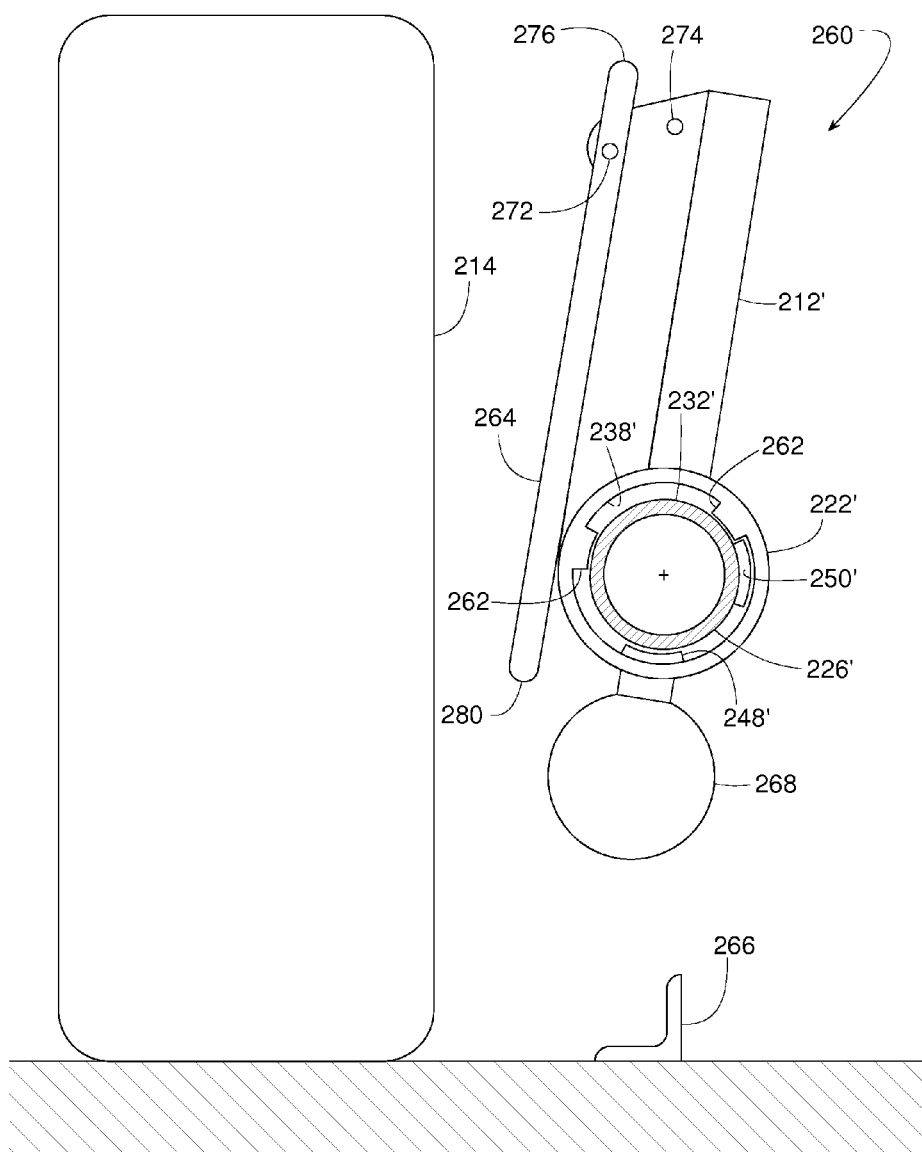
FIG. 24 is a cross-sectional view similar to FIG. 21 but showing another example wheel restraint described herein.

When arm 212' is in the generally upright release position of FIG. 24, arm 212' leans slightly back with one of guide strips 262 resting upon a series of detents or teeth 250' of track 226'. This stable leaning position is achieved by providing the movable portions of restraint 260 with a center of gravity that is slightly biased toward arm 212', rather than being biased toward a counterweight 268 of restraint 260. In the release position, track follower 222' is free to translate along track 226' in a manner similar to that of restraint 210.

To move restraint 260 to the blocking position, a dockworker manually rotates arm 212' counterclockwise 270, as shown in FIGS. 25 and 26. As track follower 222' rotates, guide strips 262 revolve or move about track 226'. A series of protrusions or keys 248' (at least one key 248') on an inner periphery 238' of track follower 222' move into meshing or engaging alignment with the plurality of detents or teeth 250', on an outer periphery 232' of track 226'. The meshing of keys 248' and teeth 250' inhibits or prevents the axial translation of track follower 222' along track 226' in the same manner as keys 248 and teeth 250 prevent the axial movement of track follower 222 along track 226 of the wheel restraint system 210 of FIGS. 14-23.

Also, as arm 212' rotates between its release position of FIG. 24 and its blocking position of FIG. 27, gravity causes brace 264 to pivot relative to arm 212' about a mounting pin 272. The pivotal movement of brace 264 is limited by some suitable stop device, such as, for example, a chain or cable extending between brace 264 and arm 212', or by way of a protruding stop pin 274. Once an upper end 276 of brace 264 engages stop pin 274, brace 264 remains at a predetermined desired angle 278 with arm 212'. When brace 264 is at angle 278, a lower end 280 of brace 264 engages (e.g., falls into) the inner corner of lower rail 266, thereby solidly propping arm 212' at its blocking position of FIG. 27.

In this example, arm 212', track follower 222, and track 226 may be less substantial, as a portion of the forces exerted onto arm 212' by wheel 214 is transferred directly to driveway 258 via brace 264, instead of through track follower 222 and track 226. Therefore, it may be possible to construct arm 212', track follower 222, or track 226 out of a lighter weight and/or less expensive material(s).

To release wheel 214, a dockworker manually rotates arm 212' from its blocking position of FIG. 27 to its release position of FIG. 24. Upon doing so, brace 264 naturally pivots about pin 272 back against arm 212'.

Track 226' can be mounted to dock 218 in the same manner as track 226. Lower rail 266 is also anchored to dock 218 and/or to track 226' with track 226' and rail 266 being substantially parallel. In this example, rail 266 has a length suitable to accommodate the travel distance of track follower 222'. However, rail 266 may have any suitable length.

In cases where lower rail 266 is not attached or coupled to track 226', but rather, the lower rail 266 is separate from track 226', then a visual or audible indicator 282 can be operatively coupled with the example wheel restraint 260 as shown in FIG. 28. In this example, indicator 282 provides a signal 284 that indicates whether restraint 260 is in the blocking position. In this example, track 226', lower rail 266, and brace 264 are electrically conductive, and brace 264 contacting rail 266 serves as an electrical switch that completes an electrical circuit 286 that activates indicator 282. For minimal wiring and convenience, electrical circuit 286 can be installed adjacent dock face 220. Signal 284 can include, for example, but not limited to, a forward facing red light for the driver of vehicle 216 or a rear facing green light for a dockworker. Signal 284 could also be used as an interlock that inhibits or enables various dock related equipment, such as a dock leveler or a door at the loading dock.

The electrical switch created by brace 264 and lower rail 266 could convey electrical current to indicator 282 directly, as schematically illustrated in FIG. 28, or the electrical current through brace 264 and rail 266 could activate or trigger a low-power relay or solid state switching device (e.g., transistor, triac, etc.), which in turn could activate indicator 282.

Although this configuration offers the benefit of using the structure of the wheel restraint to both provide a signal relating to placement of the chock or arm, and then transmit that signal via electrical current, there are other sensing and signaling means that may be used to indicate when the chock or arm has been properly placed. The sensing means could be mechanical, including limit or contact switches, where any power transmission lines may be protected by track 226 and may extend back to dock face 220.

Alternatively, means of sensing proper placement of a chock or arm may include, for example, the use of a light beam, where a light source is disposed on a first end of track 226 and a light beam receiver is disposed on a second end of track 226. When the chock, or arm, is properly positioned, some portion of the chock, or arm, will "break" or interrupt the path of the light beam, thereby indicating that the chock, or arm, is properly positioned, a condition that may trigger signal 284 to activate indicator 282.

FIGS. 29-36 show yet another example wheel restraint 300. In this example, restraint 300 includes a track follower 302 with rollers 304 that minimize or substantially reduce the manual force needed to move track follower 302 and a wheel-blocking arm 306 lengthwise along a track 308. Restraint 300 also includes a latching device 310 that prevents vehicle forces (e.g., vehicle pull-out forces) from being transmitted to rollers 304.

Figure 29:
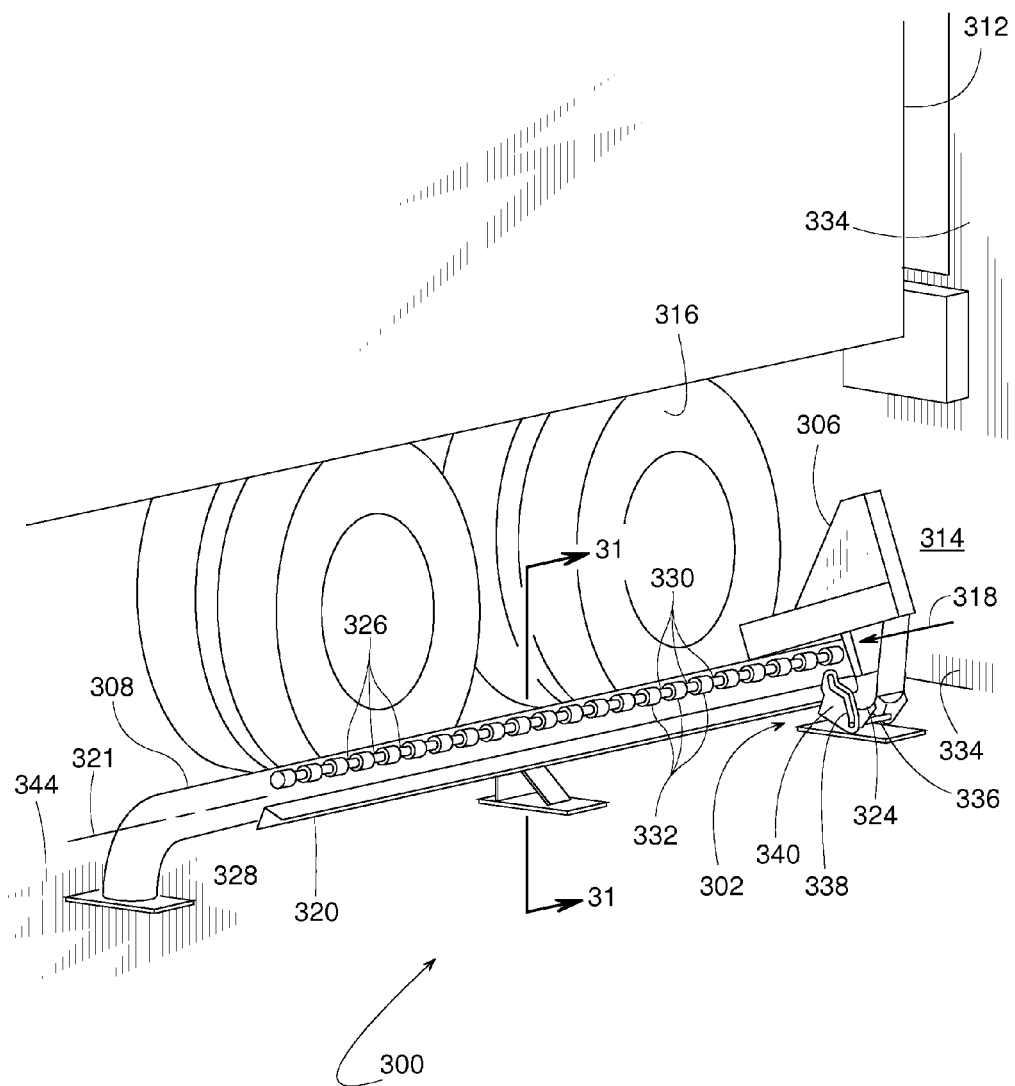
FIG. 29 is a perspective view of yet another example wheel restraint described herein shown in a release position.

In operation, vehicle 312 backs into a loading dock 314 with arm 306 in a release position, as shown in FIG. 29. Track 308 may help guide vehicle 312 into position. Once vehicle 312 is properly parked, for example, a dockworker manually pushes track follower 302 along track 308 in a direction generally parallel to a centerline 321 of track 308 until arm 306 is adjacent (e.g., slightly in front of) a selected wheel 316 of vehicle 312. (Arrow 318 represents manually moving arm 306 in a direction generally parallel to a centerline 321 of track 308). To ease or facilitate the translation of track follower 302 along track 308, rollers 304 on track follower 302 roll along a structural angle 320 or some other structural feature of track 308. Alternatively, rollers may be disposed on track 308 and structural angle 320, or similar, may be disposed on track follower 302 to ease translation of the track follower 302 along track 308. To minimize frictional forces (e.g., drag forces) between the underside of arm 306 and the upper surface of track 308, the center of gravity of arm 306 is such that rollers 304 preferably carry most of the weight of arm 306 when arm 306 is in the release position.

Figure 30:
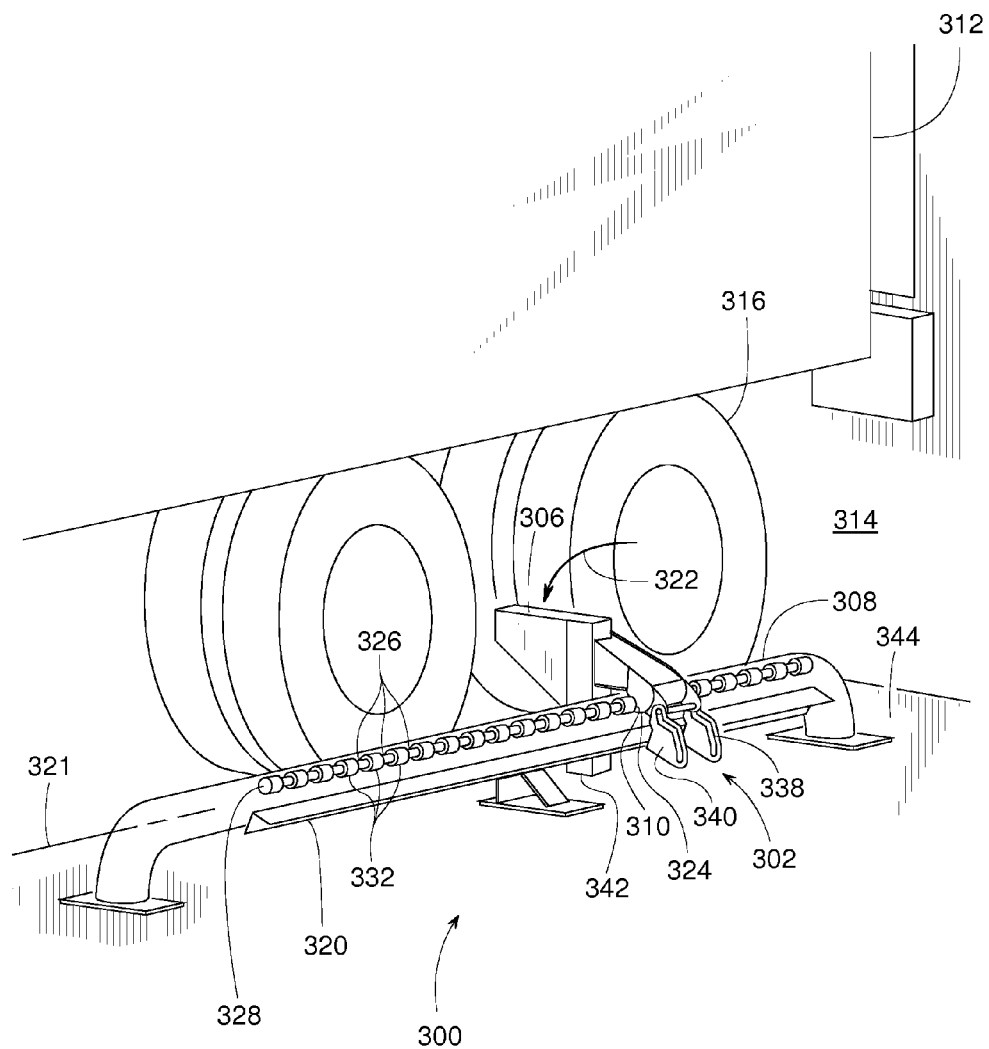
FIG. 30 is a perspective view similar to FIG. 29 but showing the example wheel restraint of FIG. 29 in a blocking position.
Figure 31:
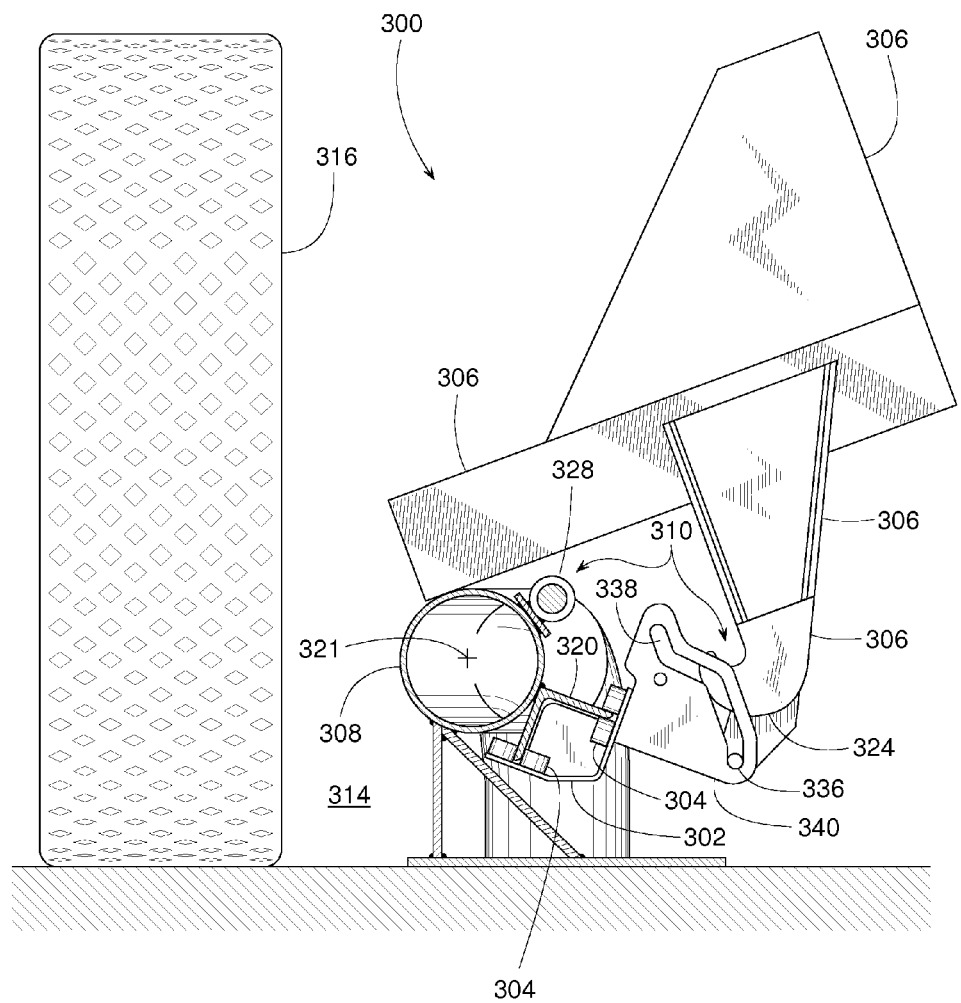
FIG. 31 is a cross-sectional view of the example vehicle restraint of FIG. 29 taken along line 31-31 of FIG. 29.
Figure 35:
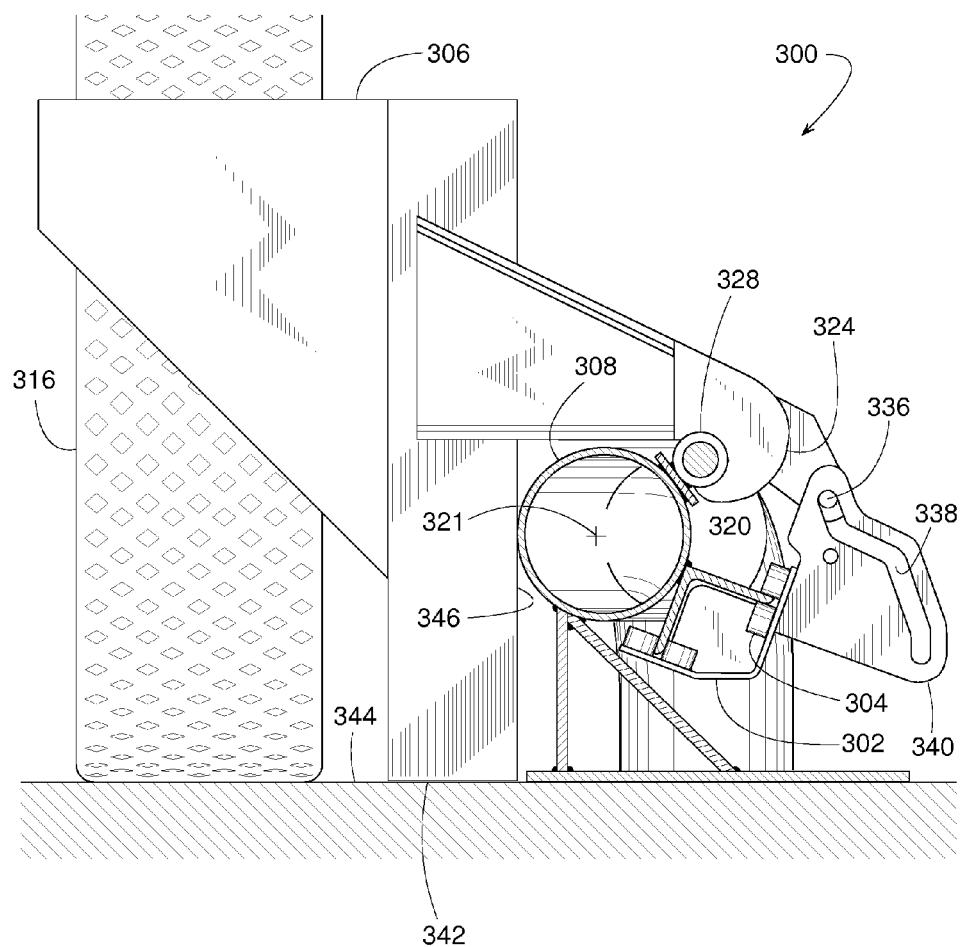
FIG. 35 is a cross-sectional view similar to FIG. 31 but showing the example wheel restraint of FIG. 29 at a blocking position.
Figure 36:
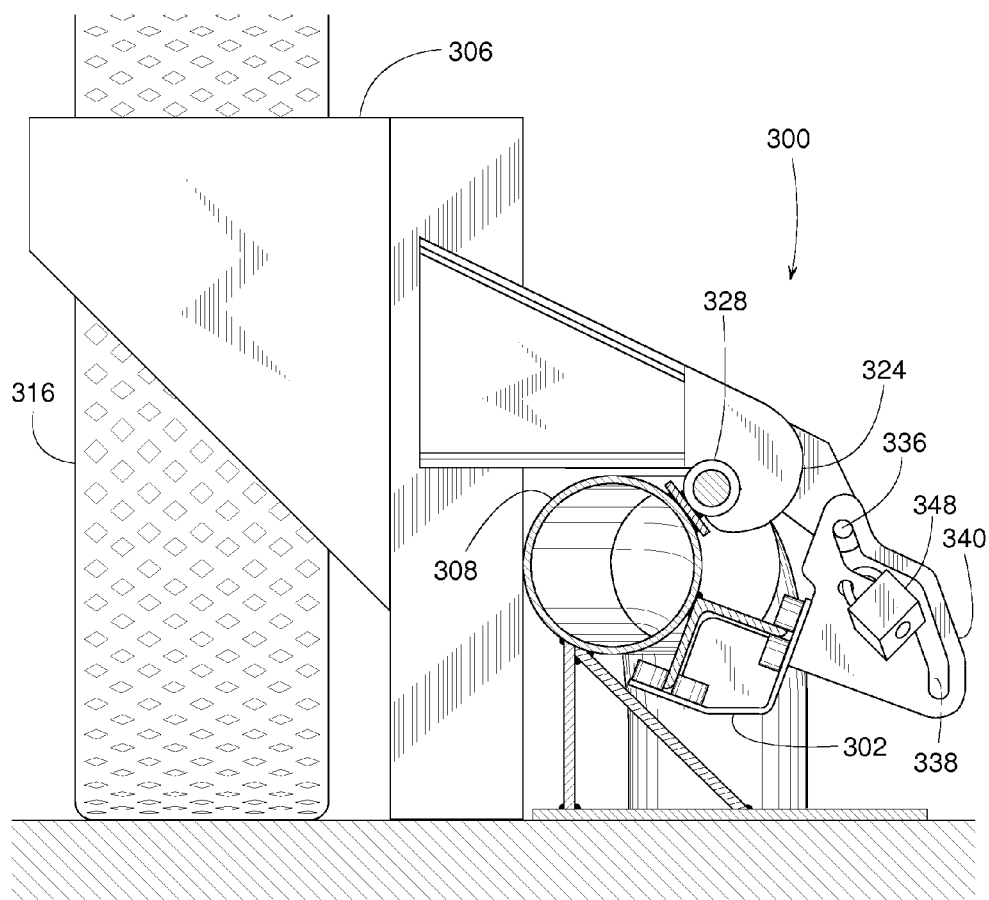
FIG. 36 is a cross-sectional view similar to FIG. 35 but showing the example wheel restraint of FIG. 29 locked at its blocking position.

When arm 306 is properly aligned relative to wheel 316, a dockworker can manually tilt or rotate arm 306 from its release position of FIGS. 29 and 31 to its blocking position of FIGS. 30, 35, and 36. Arrow 322 (FIG. 32) represents the step of rotating arm 306 around centerline 321. In the blocking position, latching device 310 effectively locks one or more protrusions in the form of hooks 324 coupled to arm 306 and track follower 302 to one or more corresponding detents 326 on track 308. In this example, detent 326 is in the form of a fixed rod 328 (e.g., welded to track 308) with a series of notches 330 between larger diameter sections 332. However in other examples, detent 326 could be any suitable structure. Once in the blocking position of FIGS. 30, 35, and 36, arm 306 presents wheel 316 with an obstruction that to prevent or resist vehicle 312 from moving (e.g., pulling away) from a dock face 334 of dock 314.

In this example of wheel restraint 300, as arm 306 moves from its release position to its blocking position, arm 306 follows a combination rotating and translating path illustrated sequentially in FIGS. 31-35. This rotating and translating path can be created by a pin 336 (or equivalent roller), which is connected to arm 306 and guided by a strategic slot 338 in a cam plate 340 affixed to track follower 302. In addition, as pin 336 travels along slot 338, arm 306 slides around track 308.

In FIG. 31, pin 336 rests upon a lower limit in slot 338. In this position, arm 306 is at a first stable point of equilibrium such that when arm 306 is at this position, arm 306 remains at this position because the arm's center of gravity is lower at this point than when arm 306 is rotating toward the next position shown in FIG. 32.

Figure 32:
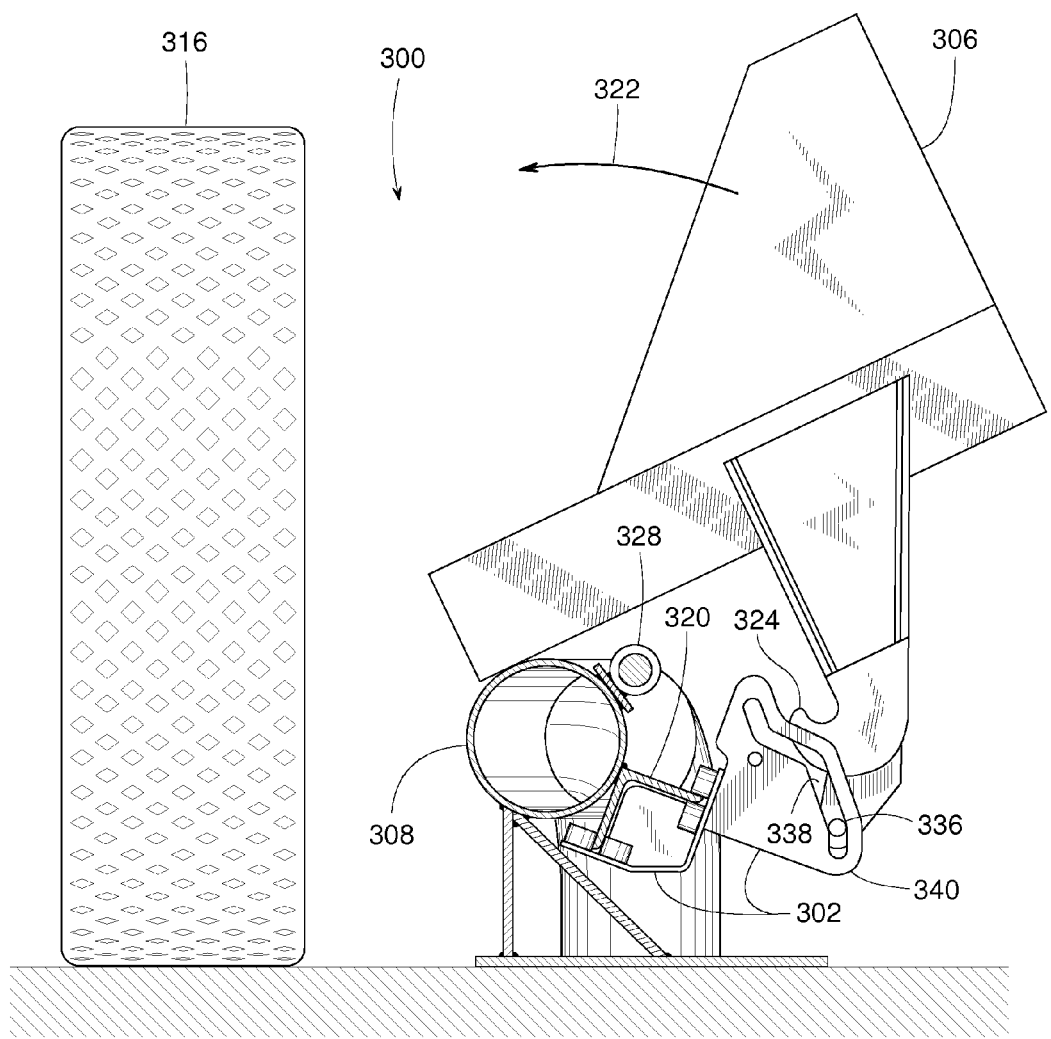
FIG. 32 is a cross-sectional view similar to FIG. 31 but showing the example wheel restraint of FIG. 29 at an intermediate position.
Figure 33:
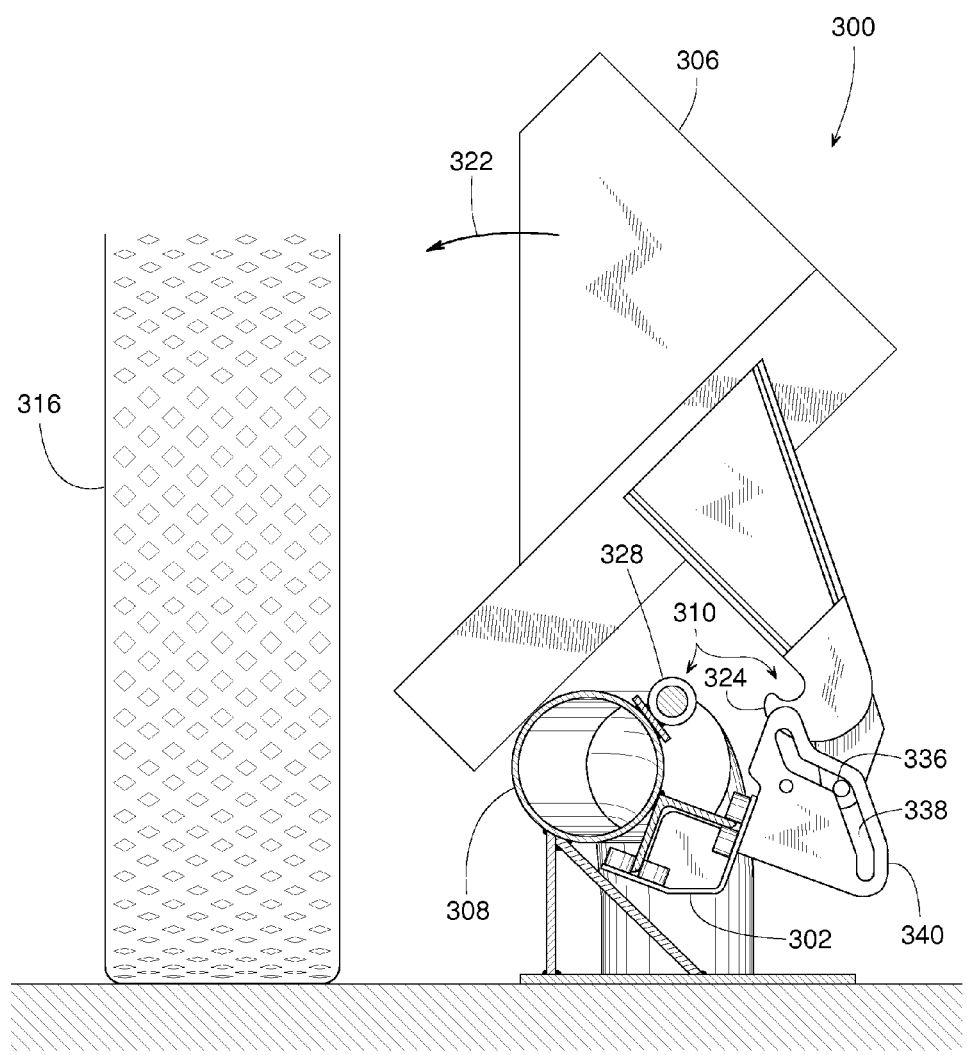
FIG. 33 is a cross-sectional view similar to FIG. 32 but showing the example wheel restraint of FIG. 29 at another intermediate position.

As arm 306 moves between the position of FIG. 32 and the position of FIG. 33, pin 336 travels upward along slot 338 and arm 306 slides down across track 308.

Figure 34:
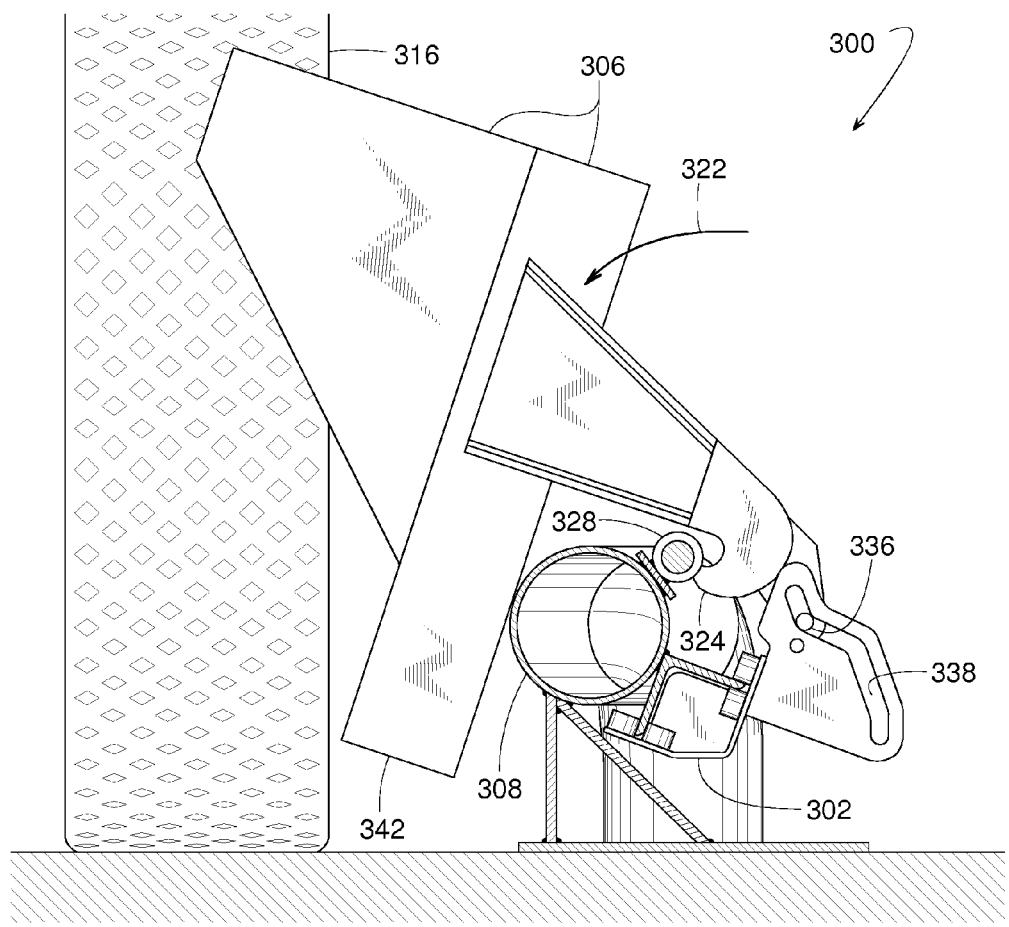
FIG. 34 is a cross-sectional view similar to FIG. 32 but showing the example wheel restraint of FIG. 29 at an intermediate blocking position.

As arm 306 moves between the position of FIG. 33 and the position of FIG. 34, slot 338 guides pin 336 to position hook 324 for proper vertical alignment with rod 328. Also, as arm 306 moves between the position of FIG. 33 and the position of FIG. 34, the arm's center of gravity passes gently through its peak elevation so that the dockworker can controllably pivot hook 324 towards rod 328 without the arm's weight overpowering the dockworker's effort.

With arm 306 at the position of FIG. 34, the arm's weight now draws hook 324 into engagement with rod 328 with hook 324 settling into a corresponding notch 330, as shown in FIG. 35. In this example, actually two individual hooks 324 engage two separate notches 330 for extra strength and stability. Once arm 306 is in the blocking position of FIG. 35, vehicle 312 is properly restrained.

FIG. 35 illustrates several notable design features of wheel restraint 300. First, when arm 306 is in the blocking position, a lower end 342 of arm 306 rests solidly upon a driveway surface 344. Surface 344 can be asphalt, gravel, concrete, or any surface upon which vehicle 312 travels. In some examples, driveway surface 344 may include an overlying protective steel plate. Either way, lower end 342 engaging driveway 344 serves to brace arm 306 against pressure from wheel 316, thus protecting track 308 and other parts of restraint 300 from damagingly high vertical forces that might be exerted by wheel 316. A substantial portion of vertical forces exerted by wheel 316 are transferred directly to driveway surface 344 (through arm 306), instead of being transferred to track follower 302 and track 308.

Additionally or alternatively, as shown in FIG. 35, hook 324 engages rod 328 and an inner surface 346 of arm 306 engages track 308 to capture track 308 between hook 324 and arm 306. Such an arrangement further protects pin 336, rollers 304, cam plate 340, and track follower 302 from being damaged by high horizontal forces or bending moments exerted by wheel 316.

Furthermore, the arm's center of gravity is at a peak elevation when arm 306 it tilted to an intermediate position between the arm's fully blocking position (FIG. 35) and the arm's release position (FIG. 31). In this manner, the arm's weight holds arm 306 at either its blocking position or release position without the need for additional hardware or structural components to hold or brace arm 306 at those positions. Furthermore, the relatively large mass of arm 306, as required to prevent movement of a vehicle, can be moved easily between blocking and release positions by an operator of the apparatus.

Although arm 306 rotates around longitudinal centerline 321 of track 308, the arm's center of rotation does not have to be centerline 321. For the illustrated example, arm 306 may rotate about an axis that is offset (e.g., eccentric) and parallel to centerline 321, and the rotational axis shifts due to the arm's additional translation upon moving between the release and blocking positions. It should be appreciated by those of ordinary skill in the art that the combination rotation/translation of arm 306 can be accomplished by various other mechanisms similar or functionally equivalent to the example mechanism disclosed herein.

Referring to FIG. 36, to prevent unauthorized personnel from releasing vehicle 312 by moving arm 306 from its blocking position to its release position, a padlock 348 (or some other suitable locking device) can be coupled to wheel restraint 300. In the illustrated example, padlock 348 limits the movement of pin 336 along slot 338, thus limiting the pivotal movement of arm 306. Locking vehicle restraint 300 can be for various purposes including, but not limited to, restraining a trailer in an open parking lot, where the trailer has been left for future pickup and transfer.

Although the example vehicle restraints have been described and shown at loading docks, the restraints may also be used at any other locations (e.g., in more open areas or yards). For example, when bulk loading tanker trailers, the trailers may be parked in an open area. In such loading operations, it is desirable to prevent the trailer from moving both forward and rearward to guard against spillage of the material being loaded into the tanker trailer. In these situations, it might be desirable to provide a single track 308 with two individual arms 306 and corresponding two track followers 302, which would allow a single wheel 316 to be restrained between two arms 306, one arm in front of wheel 316 and the other one in back of wheel 316, thereby preventing both forward and rearward movement. Alternatively, if the trailer has at least two rear wheels ("tandem" wheels), a single arm 306 may be placed between the two rear wheels to prevent both forward and rearward movement (see FIG. 30).

It should be appreciated by those of ordinary skill in the art that the sensing means disclosed herein, other sensing means, and means of signaling (e.g., indicator 282 of FIG. 28) could be added to any of the example wheel restraints 10, 60, 92, 112, 210, 260, 300 disclosed herein to sense and indicate whether the restraint is properly positioned.

At least some of the aforementioned examples include one or more features and/or benefits including, but not limited to, the following:

In some examples, a wheel restraint includes a wheel chock that is manually movable between a retracted position clear of a wheel of a vehicle at a loading dock and an operative position to block the path of the wheel. Although the wheel chock is robust enough to prevent vehicle movement, it is also easy for an operator to move the wheel chock between the retracted and operative positions. In the retracted position, the chock can be moved freely along a track mounted to a driveway of the dock. When the chock is manually moved from its retracted position to its operative position, a locking feature automatically restricts the movement of the chock relative to the track. When the chock is manually moved back to its retracted position, the locking feature automatically disengages.

In some examples, manual actuation of a lever moves a wheel chock between its operative and retracted positions and simultaneously moves a locking feature between its engaged and disengaged positions.

In some examples, a manual wheel chock moves both horizontally and vertically to selectively block and release a wheel of a vehicle at a loading dock.

In some examples, the wheel-holding force of a track-coupled manual wheel chock is primarily transmitted from the chock directly to the driveway of a loading dock, yet the wheel chock is spaced apart from the driveway when the chock is being repositioned along a track.

In some examples, appropriate communication with suitable sensors and red/green lights is readily incorporated.

In some examples, the wheel restraint is such that it is completely untouched by a wheel as the vehicle enters or leaves the dock area.

In some examples, the wheel restraint does not create any significant pockets in which an appreciable amount of dirt, rain, snow or ice can accumulate.

In some examples, the wheel restraint system does not have any moving parts at or below the surface of the driveway.

In some examples, the wheel-blocking arm in its release position can be manually slid along a rail to align the arm to a particular wheel.

In some examples, the manually operated wheel restraint includes an elevated rail that may be less susceptible to dirt and debris than a rail that is closer to the surface of a driveway.

In some examples, the structural components of a wheel restraint are electrically conductive to actuate an electrical signal that indicates the operational status of the restraint.

In some examples, the wheel chocking member is secured to a track (via a track follower) such that the wheel chocking member cannot be removed without permanent deformation of the wheel chocking member, the track, or the track follower. This helps prevent theft and misplacement of the wheel chocking member.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A wheel restraint adapted to engage a wheel of a vehicle resting upon a driveway of a loading dock, the wheel restraint comprising:
   a track defining a longitudinal axis and mountable to the loading dock such that the track is at least one of above the driveway, spaced apart from the driveway, or substantially stationary relative to the driveway;
   a track follower mounted to the track, the track follower to translate along a length of the track in a direction generally parallel to the longitudinal axis;
   a latch associated with the track and the track follower; and
   an arm rotatably coupled to the track follower and configured to rotate around the longitudinal axis at any position along the length of the track, the arm to protrude away from the track follower and movable relative to the track between a blocking position and a release position such that:
   a) in the blocking position, the arm extends away from the track follower to obstruct the wheel and a portion of the arm engages the driveway, and the latch renders the track follower and the arm generally fixed in relation to the track to limit translation of the track follower and the arm in the direction generally parallel to the longitudinal axis; and
   b) in the release position, the arm is clear of the wheel such that it no longer obstructs the wheel, and the latch allows the track follower and the arm to freely translate along the track.

2. The wheel restraint of claim 1, wherein the latch includes a plurality of detents disposed along the track and a plurality of protrusions coupled to the track follower.

3. The wheel restraint of claim 2, wherein at least one of the plurality of protrusions to engage at least one of the plurality of detents renders the track follower and the arm generally fixed in relation to the track to limit translation of the track follower and the arm in the direction generally parallel to the longitudinal axis.

4. The wheel restraint of claim 2, wherein the plurality of protrusions comprises a plurality of hooks.

5. The wheel restraint of claim of claim 1, wherein the arm moves in a combination of rotation and translation upon moving between the blocking position and the release position.

6. The wheel restraint of claim 1, wherein the track follower translates along the track under manual force.

7. The wheel restraint of claim 1, wherein the arm moves between the blocking position and the release position under manual force.

* * * * *